United States Patent
Soukhman et al.

(10) Patent No.: US 11,366,750 B2
(45) Date of Patent: Jun. 21, 2022

(54) CACHING TECHNIQUES

(71) Applicant: EMC IP Holding Company LLC, Hopkinton, MA (US)

(72) Inventors: Alex Soukhman, Raanana (IL); Uri Shabi, Tel Mond (IL); Bar David, Rishon Lezion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/030,545

(22) Filed: Sep. 24, 2020

(65) Prior Publication Data

US 2022/0091976 A1 Mar. 24, 2022

(51) Int. Cl.
*G06F 12/00* (2006.01)
*G06F 12/02* (2006.01)
*G06F 12/0882* (2016.01)
*G06F 12/0817* (2016.01)
*G06F 12/0831* (2016.01)

(52) U.S. Cl.
CPC ...... *G06F 12/0246* (2013.01); *G06F 12/0822* (2013.01); *G06F 12/0824* (2013.01); *G06F 12/0833* (2013.01); *G06F 12/0882* (2013.01); *G06F 2212/7201* (2013.01); *G06F 2212/7207* (2013.01)

(58) Field of Classification Search
CPC ............ G06F 12/0246; G06F 12/0822; G06F 12/0824; G06F 12/0833; G06F 12/0882; G06F 2212/7201; G06F 2212/7207

See application file for complete search history.

(56) References Cited

U.S. PATENT DOCUMENTS

| | | | |
|---|---|---|---|
| 2001/0013089 A1* | 8/2001 | Weber ................. | G06F 12/0831 711/146 |
| 2006/0248287 A1* | 11/2006 | Buyuktosunoglu ......................... | G06F 12/0897 711/146 |
| 2007/0101068 A1 | 5/2007 | Anand et al. | |
| 2010/0180084 A1* | 7/2010 | Cypher ............... | G06F 12/0822 711/135 |
| 2017/0168939 A1* | 6/2017 | Jalal .................... | G06F 12/0815 |

OTHER PUBLICATIONS

Vladimir Shveidel, et al, "System and Method for Aggregrating Metadata Changes in a Storage System," U.S. Appl. No. 16/260,660, filed Jan. 29, 2019.
International Search Report dated Aug. 5, 2021.

* cited by examiner

*Primary Examiner* — Gurtej Bansal
(74) *Attorney, Agent, or Firm* — Muirhead and Saturnelli, LLC

(57) ABSTRACT

Techniques for caching may include: determining an update to a first data page of a first cache on a first node, wherein a second node includes a second cache and wherein the second cache includes a copy of the first data page; determining, in accordance with one or more criteria, whether to send the update from the first node to the second node; responsive to determining, in accordance with the one or more criteria, to send the update, sending the update from the first node to the second node; and responsive to determining not to send the update, sending an invalidate request from the first node to the second node, wherein the invalidate request instructs the second node to invalidate the copy of the first data page stored in the second cache of the second node.

19 Claims, 14 Drawing Sheets

CACHING TECHNIQUES

BACKGROUND

Technical Field

This application generally relates to caching.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for caching comprising: determining an update to a first data page of a first cache on a first node, wherein a second node includes a second cache and wherein the second cache includes a copy of the first data page; determining, in accordance with one or more criteria, whether to send the update from the first node to the second node; responsive to determining, in accordance with the one or more criteria, to send the update, sending the update from the first node to the second node; and responsive to determining not to send the update, sending an invalidate request from the first node to the second node, wherein the invalidate request instructs the second node to invalidate the copy of the first data page stored in the second cache of the second node. The update may include one or more modifications to the first data page.

In at least one embodiment, processing may include applying the update to the first data page of the first cache on the first node, wherein the first data page of the first cache of the first node includes a current content prior to applying the update and wherein the first data page of the first cache of the first node includes an updated content after applying said update to the current content. Determining the update may further comprise determining a result of performing a bit wise logical exclusive XOR operation of the current content and the updated content. Sending the update may include sending the result as the update from the first node to the second node.

In at least one embodiment, the copy of the first page may be stored in a first cache location of the second cache of the second node, and the method may include the second node performing first processing comprising: receiving the result from the first node; determining, in accordance with the result, the updated content of the first page; and updating the first cache location of the second cache of the second node by storing the updated content of the first page at the first cache location of the second cache of the second node. Determining the update may include determining a compressed result by compressing the result of the bit wise logical exclusive XOR operation of the current content and the updated content. Sending the update may include sending the compressed result as the update from the first node to the second node. The copy of the first page may be stored in a first cache location of the second cache of the second node, and processing may include the second node performing first processing comprising: receiving the compressed result from the first node; determining, in accordance with the compressed result, the updated content of the first page; and updating the first cache location of the second cache of the second node by storing the updated content of the first page at the first cache location of the second cache of the second node.

In at least one embodiment, the one or more criteria may indicate to send the update from the first node to the second node if the update has a size that is less than a specified threshold. The one or more criteria may indicate to send the update from the first node to the second node if the update is associated with a logical address of a logical device and the logical device is designated as performance critical. The one or more criteria may indicate to send the update from the first node to the second node if the update is associated with a logical address included in a logical address subrange of a logical device and the logical address subrange of the logical device is designated as performance critical.

In at least one embodiment, the techniques may be performed in connection with data deduplication of a candidate data block that is a duplicate of an existing target data block, wherein the target data block is stored at a first logical address of a first logical device, and wherein the candidate data block is stored at a second logical address of a second logical device. The first data page may be a first metadata page including metadata associated with a second logical address of the second logical device. Prior to the data deduplication of the candidate block, the first logical address of the first logical device may be mapped to the existing target data block and the second logical address of the second logical device may not be mapped to the existing target data block. After the data deduplication of the candidate block, the second logical address of the second logical device may be mapped to the existing target data block and the first logical address of the first logical device may be mapped to the existing target data block. The update may include a first data modification to the first metadata page and wherein the first data modification may include an incremented value of a reference count denoting a number of times the existing target data block is mapped to a logical address.

In at least one embodiment, a metadata structure may include the first metadata page, a second metadata page, and a third metadata page, wherein the first metadata page may include a first entry that references the existing target data block and wherein the first entry may include the reference counter denoting the number of times the existing target data block is mapped to a logical address, wherein the second metadata page may include a second entry associated with the first logical address of the first logical device and the second entry may reference the first entry, and wherein the third metadata page may include a third entry associated with the second logical address of the second logical device and the third entry may reference the first entry. The processing performed may include: determining a second update to the third metadata page and wherein the second update includes a pointer from the third entry of the third metadata page to the first entry of the first metadata page; determining, in accordance with the one or more criteria, whether to send the second update from the first node to the second node; responsive to determining, in accordance with the one or more criteria, to send the second update, sending the second update from the first node to the second node; and responsive to determining not to send the second update, sending a second invalidate request from the first node to the second node, wherein the second invalidate request instructs the second node to invalidate the copy of the third metadata page stored in the second cache of the second node. The metadata structure may be used to access data stored at logical addresses of one or more logical devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
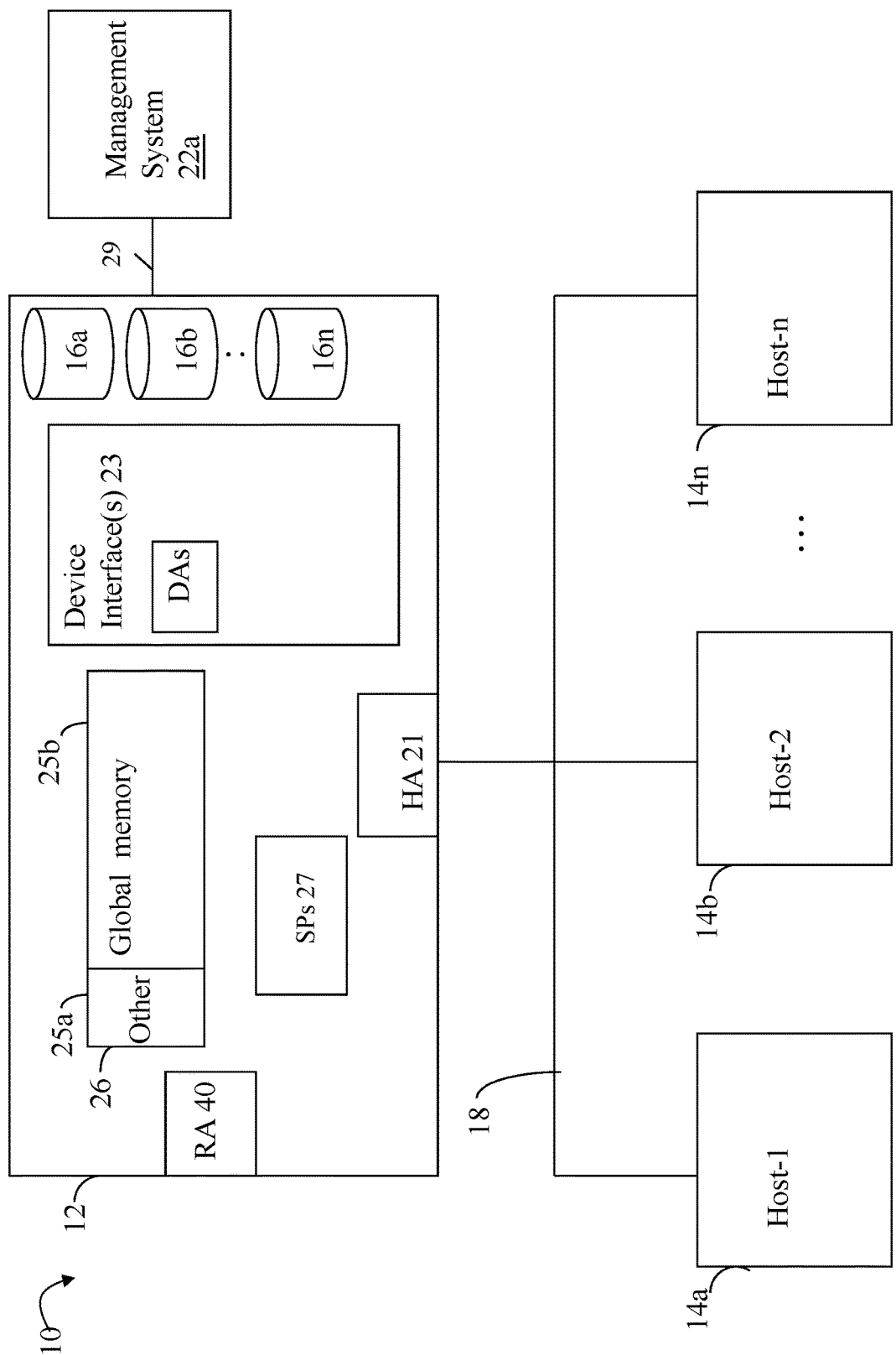
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS (Network File System)), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts and also provides for persistent or non-volatile data storage. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface(s) 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location (e.g., logical address) from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with the techniques herein may perform different data processing operations or services on data stored on the data storage system. For example, the data storage system may perform one or more data reduction operations, such as data deduplication. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication techniques are known in the art and any suitable such technique may be used in an embodiment in accordance with the techniques herein. In at least one embodiment in accordance with the techniques herein, data deduplication processing performed may include digest or hash value computation using an algorithm such as based on the SHA-256 cryptographic hashing algorithm known in the art. Data deduplication generally refers to removing redundant or duplicate data portions. Data deduplication techniques may include looking for duplicate data blocks whereby only a single instance of the data block is retained (stored on physical storage) and where pointers or references may be used in connection with duplicate or redundant copies (which reference or identify the single stored instance of the data block).

Figure 2A:
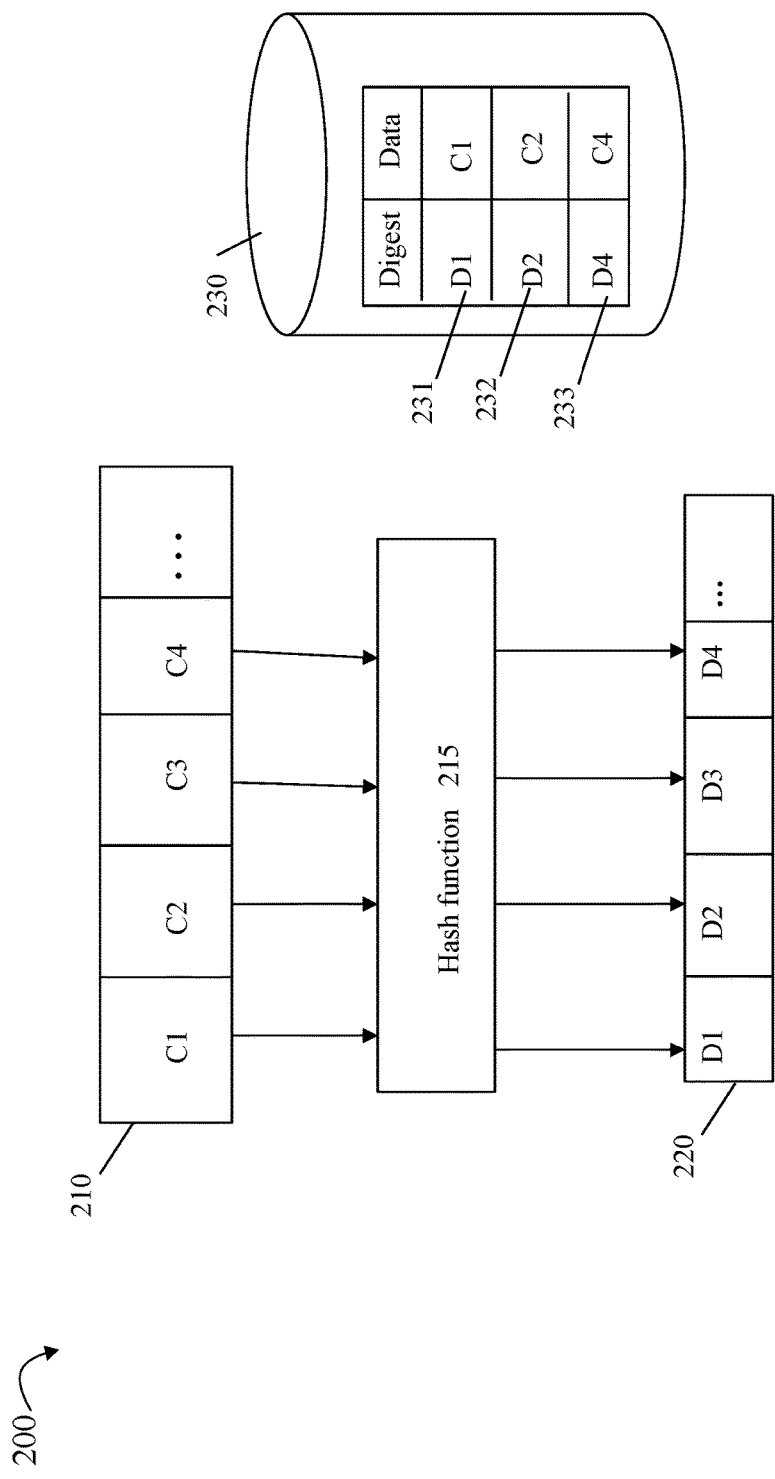
FIG. 2A is an example illustrating data deduplication as may be performed in an embodiment in accordance with the techniques herein.

Referring to the FIG. 2A, shown is an example 200 illustrating processing that may be performed in connection with data deduplication processing in an embodiment in accordance with the techniques herein. The element 210 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. Each block is provided as an input to hash function 215. As noted above, in at least one embodiment, the hash function 215 may be the SHA-256 hashing algorithm, or more generally, any suitable cryptographic, or non-cryptographic hashing function known in the art. For each block of 210, the hash function 215 may perform processing and generate, as an output, a hash value, hash or digest derived from the block 210. The element 220 includes hashes D1, D2, D3, D4, and the like, where a corresponding different one of the hashes DN is generated for each one of the blocks CN (where "N" is an integer denoting the block and associated hash value generated for that block). For example, D1 is the hash generated for C1, D2 is the hash generated for C2, D3 is the hash generated for C3, and so on. Generally, a hash function 215 is selected which has an acceptably low probability of a "hash collision" of generating the same digest or hash value for two different blocks. The strength of the hash function 215 may be measured by the unlikelihood of a collision occurring where two different input blocks of data produce the same hash. The strength increases with the bit length of the hash value, hash or digest. Thus, if two blocks, such as C1 and C3, have the same hashes whereby D1=D3, then blocks C1 and C3 match (e.g., are identical matching data blocks). If two blocks, such as C1 and C4, have different hashes whereby D1 does not equal D4, then blocks C1 and C4 do not match (e.g., are different or non-matching data blocks). In cases where two matching or identical blocks have the same hash, only a single copy of the data block is stored on backend non-volatile physical storage of the data storage system. The single stored instance of the data block may be referenced using a pointer, handle, the hash of the block, and the like.

The element 230 of the FIG. 2A may denote the data store, such as a data base (DB) used to store data blocks. In this example, as noted above, assume blocks C1 and C3 are the same with remaining blocks C2 and C4 being unique. In at least one embodiment, the data store 230 may be organized and managed using a data structure, such as a hash table. In at least one embodiment, computed hashes, or portions thereof, may be used as an index into the hash table where the single unique instances of data blocks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the block of data may be mapped by hash function 215, and thus by the block's hash, to a particular entry in the table at which the block of data is stored. To further illustrate, the hash function 215 may be used to generate a hash value, hash or digest for a particular data block. The hash is then further mapped (e.g., such as by another mathematical function, using particular portions of the hash, and the like) to a particular index or entry of the hash table. The particular mapping used to map the hash to a corresponding table entry varies, for example, with the hash and the size of hash table.

When storing a new data block, such as C1, its hash may be mapped to a particular hash table entry 231 whereby if the table entry is null/empty, or otherwise does not already include a data block matching C1, then C1 is stored in the table entry along with its associated hash D1 (this is the first time block C1 is recorded in the data store 230). Otherwise, if there is already an existing entry in the table including a data block matching C1, it indicates that the new data block is a duplicate of an existing block. In this example as noted above, processing is performed for C1, C2, and C4 respectively, where entries 231, 232, and 233 are added since there are no existing matching entries in the hash table. When processing block C3, as noted above, C3 has a hash D3 matching D1 whereby C3 (and thus D3) maps to entry 231 of the hash table already including a matching block C1 (so no additional data block is added to 230 for C3 since C3 is determined as a duplicate of C1). In connection with representing a particular file or other storage entity including multiple duplicate occurrences of a particular block such as C3, the single instance or copy of the data may be stored in 230. Additionally, a handle or reference, such as identifying the hash table entry 231, its hash, and the like, may be used to reference the single instance or copy of the data storage in 230. When reconstructing or restoring data to its original form, the handle or reference into the hash table for block C3 may be used to obtain the actual block C3 of data from 230.

Figure 2B:
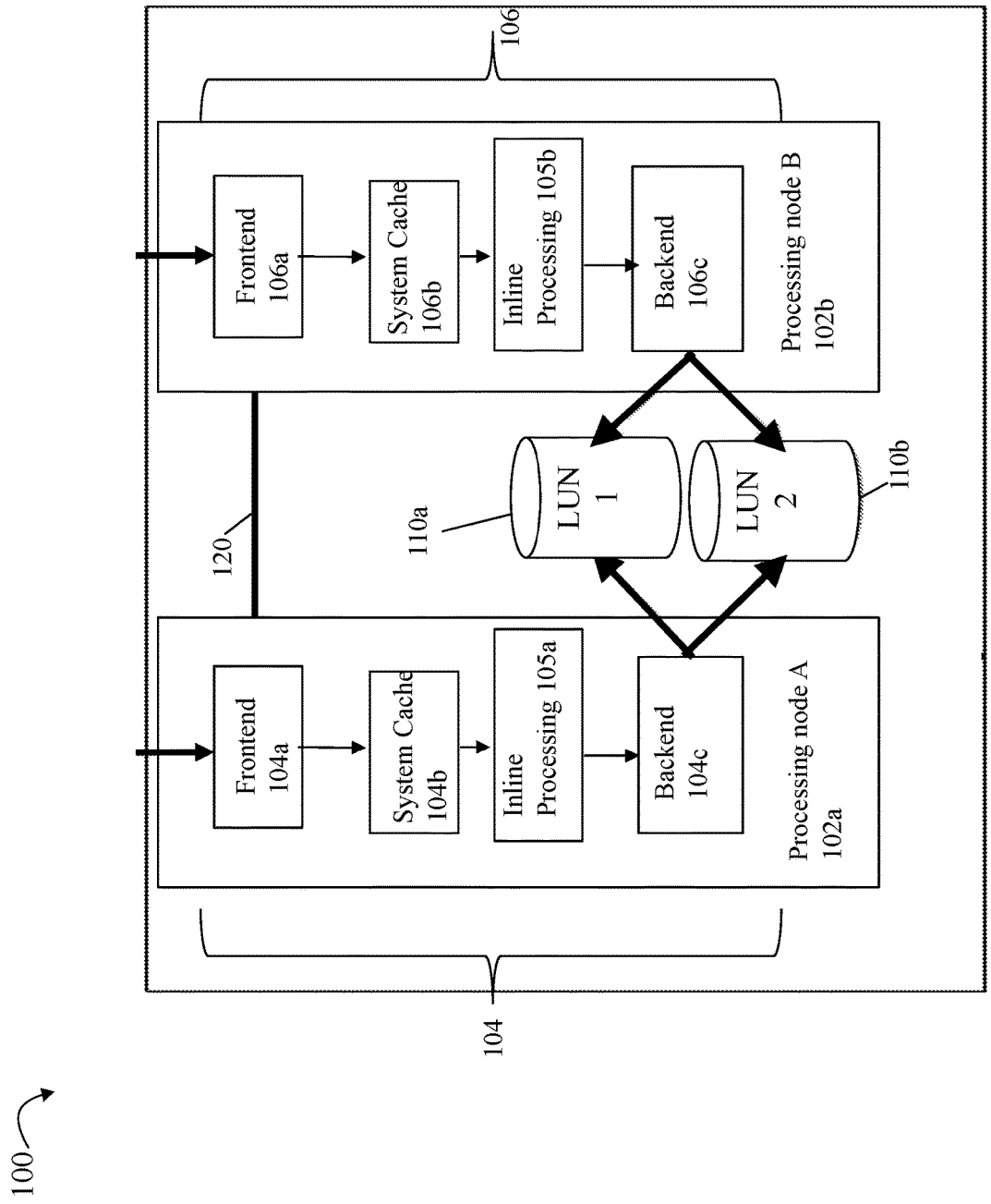
FIG. 2B is an example illustrating the I/O path or data path in connection with processing data in an embodiment in accordance with the techniques herein.

With reference to the FIG. 2B, shown is an example 100 illustrating components that may be included in the data path in at least one existing data storage system in accordance with the techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an HA, FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include performing data duplication. Although in following paragraphs reference may be made to inline processing including data deduplication, more generally, the inline processing may include performing any suitable or desirable data processing operations as part of the I/O or data path (e.g., where such operations may include data deduplication as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. The elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b.

In connection with the inline processing layer 105a, prior to storing the original data on the physical storage 110a, 110b, data deduplication processing may be performed that converts the original data (as stored in the system cache prior to inline processing) to a resulting form (that may include deduplicated portions) which is then written to physical storage 110a, 110b. In at least one embodiment, when deduplication processing determines that a portion (such as a block) of the original data is a duplicate of an existing data portion already stored on 110a, 110b, that particular portion of the original data is stored in its deduplicated form.

In connection with a read operation to read a block of data, a determination is made as to whether the requested read data block is stored in its original form (in system cache 104b or on physical storage 110a, 110b), or whether the requested read data block was previously deduplicated. If the requested read data block (which is stored in its original non-deduplicated form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. Thus, requested read data stored on physical storage 110a, 110b may be stored in a deduplicated form as noted above where processing is performed by 105a to restore or convert the deduplicated form of the data to its original data form prior to returning the requested read data to the host.

Also illustrated in FIG. 2B is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage.

When the processor performs processing, such as in connection with the inline processing 105a, 105b as noted above, data may be loaded from the main memory and/or other lower cache levels into its CPU cache. In particular, inline data deduplication (ILD) may be performed as part of the inline processing 105a, 105b. An embodiment may perform deduplication processing inline as part of the data path or I/O path. More generally, deduplication may be performed at any suitable time supported in an embodiment. For example, in at least one embodiment, deduplication processing may also be performed offline not as part of the data path or I/O path on data stored on BE PDs.

Some existing implementations of deduplication use a deduplication data store (dedupe data store or DB) as described in connection with the element 230 of the FIG. 2A having a hash table organized by indices which are randomly distributed and approximate a uniform distribution.

Data deduplication may be performed at the data block level of granularity, for example, where each entry of the data store 230 is mapped to a single unique data block. As sometimes used herein, a target data block, target block or dedupe target refers to a single unique instance of a data block currently stored in the dedupe data store 230. Also sometimes used herein, reference is made to a candidate data block, candidate block or dedupe candidate that refers to a data block for which deduplication processing is performed with the goal of eliminating duplicate candidate blocks from being stored. A hash may be computed for the candidate data block using a hash function whereby the hash identifies the candidate data block with a high level of uniqueness, even though the hash is typically much smaller than the candidate data block itself. Hashes thus enable data block matching between the candidate and target data blocks in the dedupe data store 230 to proceed quickly and efficiently. Consistent with discussion above, for each hash in an entry of the dedupe data store 230, the data store 230 may store a pointer that leads to a stored version of the respective target data block. To perform deduplication on a particular candidate block, a storage system computes a hash of the candidate block and searches the dedupe data store 230, or a cached version thereof, for an entry that matches the computed hash. If a match is found, the storage system may then compare the actual content of the target block with the content of the candidate block to ensure the target and candidate data blocks having matching content. If the target and candidate data blocks having matching content, processing may arrange metadata of the candidate block to point to the target data block that the dedupe data store 230 has associated with the matching hash. In this manner, a duplicate copy of the data block is avoided.

In at least one embodiment, the data storage system may be configured to include one or more pairs of nodes, where each pair of nodes may be generally as described and represented as the nodes 102a-b in the FIG. 2B. For example, a data storage system may be configured to include at least one pair of nodes and at most a maximum number of node pairs, such as for example, a maximum of 4 node pairs. The maximum number of node pairs may vary with embodiment.

In at least one embodiment, each pair of nodes may be configured in an active-active configuration as described elsewhere herein, such as in connection with FIG. 2B, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD, directly or indirectly, through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path.

Consistent with other discussion herein, data for I/Os and other processing may be stored in the cache with a goal of providing faster access to the stored data when needed as opposed, for example, retrieving the data from the backend PDs. Data may be stored in the cache in a cache memory location, such as a cache slot or cache page. At various points in time, there may not be any free or available cache or the amount of free or available cache may reach a minimum threshold level. In response to such conditions and possibly others, processing may be performed in connection with cache management to obtain a free or available cache location such as by evicting one or more cache pages. Generally, any suitable cache management technique known in the art may be used to manage the cache. For example, an embodiment may employ the least recently used (LRU) cache management technique which may remove data from cache based on when the data has been last referenced. For example, a time stamp may be associated with each data portion stored in the cache where the time stamp denotes the last time (e.g., date, hour, minutes, seconds in terms of wall clock time) the data portion was referenced. The most recently referenced data may have the most recent time stamp and may remain in the cache longer than other data referenced having older time stamps. The foregoing time stamps may be used to select particular data for eviction when a new cache location is needed to store new data. The foregoing time stamps may also be used in a proactive cache management technique, for example, to select data for removal when the amount of free or available cache falls below a specified amount.

An embodiment may cache user or client data in the cache, where such user or client data is read by a host read I/O operation or written by a host write I/O operation. An embodiment may also store additional information for cached user or client data in the data cache. For example, for a particular LUN and offset at which user data is stored, such additional information may map the particular LUN and offset to a cache location containing the data for that LUN and offset. Such additional information may also, for example, map a particular PD and PD offset (denoting a backend non-volatile storage location on a PD) to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16a-n.

Data storage systems may include different storage tiers having different types of non-volatile storage media. For example, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers—an SSD tier of flash-based drive, a tier of 15K RPM rotating disk drives and a tier of 10K RPM rotating disk drives. The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the data storage system may include multiple SSD tiers of non-volatile storage where each of the SSD tiers has different characteristics that affect latency when accessing the physical storage media to read or write data.

Figure 2C:
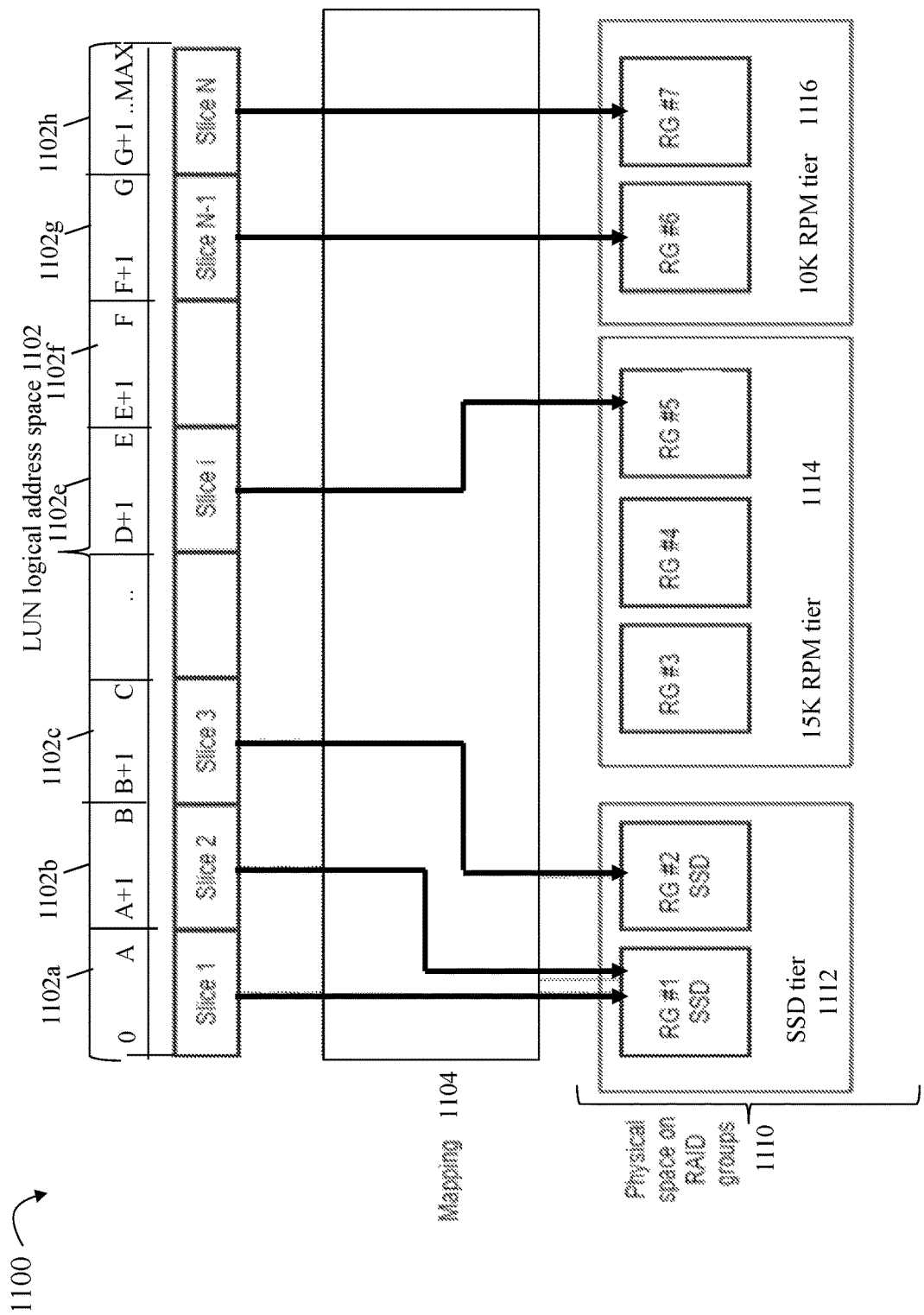
FIG. 2C is an example illustrating logical to physical mapping that may be used in an embodiment in accordance with the techniques herein.

Referring to FIG. 2C, shown is an example illustrating logical to physical mapping in a data storage system. The example 1100 illustrates how the logical address space or range of a LUN 1102 is mapped via mapping information 1104 to different slices, segments or more generally, portions of physical memory of non-volatile physical storage devices (PDs 1110) providing back-end data storage, such as denoted by PDs 16a-n in FIG. 1. The example 1100 include storage tiers 1112 (SSD tier), 1114 (15K RPM tier) and 1116 (10K RPM tier) comprising the PDs 1110 as noted above. Element 1102 may denote the LUN's logical address space, having a starting logical address, block or offset of 0, and an ending maximum logical address, MAX. The LUN's logical address space 1102 in the example 1100 is partitioned into equal logical address space portions (denoted by 1102a-h) where each of the portions 1102a-h is mapped to region of physical storage, also referred to as slices or segments, on the different PDs of different ones of the storage tiers of 1110. As noted above, data storage system software may periodically remap portions of the LUN's logical address space to keep the most actively used or accessed portions of 1102a-n on slices of the highest performance tier 1112 in efforts to maximum data storage system I/O performance. As shown in FIG. 2C, PDs of the tiers 1112, 1114 and 1116 may be configured into RAID groups (denoted as RG #1-7 in FIG. 2C) each having a suitable RAID level to provide data protection.

In connection with user data that is written to a LUN and then stored on the PDs, or more generally, BE PDs (e.g., non-volatile storage devices), various types of metadata (MD) may also be stored. The MD may include, for example, various structures used to access the stored user data, attributes about the LUN, and the like. To further illustrate, the MD for a LUN may include the mapping information 1104, also sometimes referred to as location information or location MD, identifying where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for an LBA of a LUN may include location MD or mapping information identifying the physical storage location mapped to the particular LBA.

When performing various data storage services or processing I/O operations that access data stored on a LUN, data read from and/or written to a LUN may be processed using the typical I/O or data path such as described herein. For example, consistent with other discussion herein, when reading data from a LUN of the data storage system, the data may be read from the LUN, stored in the cache of the data storage system, and then further read from the cache for use by one or more other components of the data storage system. For example, data may be read from a LUN in response to a read I/O from a client, such as an external host. The data may result in a cache miss wherein the requested read data is read from a backend PD and then stored in the cache. The read data stored in the cache may then be read by another component, such as a front end component that is an HA or an FA, that returns the read data from the cache to the client that issued the read I/O operation.

As noted above and elsewhere herein, the location MD or mapping information may be used and required in order to access and read the associated user data stored on the LUN and therefore from provisioned storage of the backend PDs mapped to the LUN. Thus, the accessing the user data from the PDs may include reading associated MD as well as the user data from the PDs into the cache if such location MD and user data are not already located in the cache. For example, the location MD describing the physical storage location for the user data stored at LUN A, LBA 5 may be read from a backend PD and stored in the cache. Subsequently, the cached location MD may be read to determine the physical storage location on a backend PD for the user data stored at LUN A, LBA 5. Using the cached location MD, processing may proceed to read such user data for the LUN A, LBA 5 from the physical storage location of the backend PD into the cache. The user data and associated location MD or mapping information may remain in the cache until removed based on the particular cache management policy of the cache.

Generally, it may be desirable to keep or retain in the cache as much of the location MD or mapping information (e.g., used to read and/or write user data stored on LUNs) as possible. Furthermore, a data storage system may generally attempt to store as much location MD or mapping information for all LUNs as possible in the cache. However, the cache is typically a limited resource and there may not be a sufficient amount of cache to store all the needed MD, such as for the LUN A and other LUNs of the system, in the cache. As a result, the data storage system may store the more frequently accessed location MD for the LUNs in the cache with remaining location MD for the LUNs stored on the backend PDs. As may be needed such as in connection with servicing I/Os, the location MD for the LUNs stored on a backend PD may be loaded into the cache. In this case, a data storage system may use a paging mechanism for paging MD into cache from PDs and for storing cached MD to the PDs in order to reduce the amount of cache consumed with storing all desired the MD. The data storage system may also use paging in connection with mapping user data stored on the PDs in and out of memory.

Paging is generally known in the art and commonly used in connection with memory management, such as for virtual memory management. In connection with virtual memory management, paging is a method of writing data to, and reading it from secondary storage, such as physical disk or other non-volatile storage, for use in primary storage, such as main memory. In a memory management system that takes advantage of paging, the operating system reads data from secondary storage in blocks or chunks that may also be referred to as pages. Since the amount of the primary storage is typically much smaller than the amount of data on secondary storage, it is not possible to store all such data in the primary storage. Thus, data may be read from secondary storage and stored in the primary storage as needed. When the primary storage no longer has available locations and another primary storage location is needed for storing new or additional data not already in primary storage, techniques may be used to select a primary storage location whereby any data in the selected primary storage location may be overwritten with the new or additional data. Prior to overwriting the selected primary storage location with the new or additional data, the current data of the selected primary storage location may be written out, as needed, to its corresponding secondary storage location (e.g., written out if the primary storage location copy is more recent or up to date than the secondary storage copy). In such a case, the current data in the selected primary location may be characterized as paged out of the primary memory (e.g., available on secondary storage but not primary storage) and the new or additional data may be characterized as paged in to the primary memory. The new or additional data is also stored on the secondary storage.

In connection with storing MD, such as location MD, in the cache, paging may be performed in a similar manner where the primary storage is the cache and the secondary storage is the physical storage device or PDs (e.g., disk or flash-based non-volatile BE PDs accessed by the DAs). Thus, MD may be retrieved from back-end PDs as needed and stored in the cache, such as for servicing read operations requesting user data associated with the MD. Once the MD is in cache, such MD may be removed from cache (e.g., evicted, removed, overwritten, paged out, and the like) as cache locations storing such MD are needed in connection with other subsequent processing. A page may refer to a single unit or amount of memory located in the cache, whereby MD stored in each page in the cache may be brought into the cache (e.g., paged into the cache) and also paged out of (e.g., evicted from) the cache as may be needed. Various techniques may be used for general cache management (e.g., eviction policy for selecting data of cache slots for removal from cache, flushing policy for determining when and/or how much write pending data to flush from cache to non-volatile storage, and the like).

In at least one embodiment, a page table may be used to map or perform address translations of a physical storage location or address of a MD page on a PD (e.g., also sometimes referred to as an on-disk address or location) to a cache address or location, if that particular MD page is currently loaded in cache. Thus, the page table may be queried to return a cache location of a desired MD page based on the physical location or address of the MD page as stored on a back-end PD. If the particular MD page having a specified physical location on a PD is not currently stored in cache, the page table will not contain any mapping to a corresponding cache location. In such a case, a read or cache miss results as described elsewhere herein. Responsive to the read or cache miss with respect to a particular MD page located at a particular on-disk address or location, processing may be performed to page in the MD page (e.g., read the MD page from physical storage of the PD and store the MD page in cache).

In at least one embodiment, the mapping information or location MD 1104 may be a data structure including multiple layers of MD nodes that ultimately map to the data blocks (DBs) (e.g., physical storage locations) including data or contents. In at least one embodiment, the structure mapping information 1104 may be a multiple layer mapping structure accessed to convert a logical address of the LUN to a physical address of a data block. In at least one embodiment, the structure 1104 may include multiple levels or layers of MD nodes or pages arranged in a hierarchy. In at least one embodiment, the bottom or lowest layers in the hierarchy of MD nodes may include MD leaf nodes and VLBs (virtualization layer blocks). Each of the MD leaf nodes may point to or reference (directly or indirectly) one or more blocks of stored data, such as user data stored on the LUN. In at least one embodiment, each MD leaf node may be mapped to 512 data blocks using an intervening layer referred to as a virtualization layer of blocks or VLB layer. Each of the VLB blocks of the VLB layer may include 512 entries where each entry points to a data block storing user data. Each of the 512 pointers in a single MD leaf may point to a different entry of a VLB where the entry of the VLB further points to a data block storing user data. The intervening VLBs of the VLB layer may be used, for example, to relocate the underlying data blocks, facilitate data reduction techniques where two MD leaf nodes may point to the same VLB entry identifying the shared data block, and the like. This is illustrated in more detail described elsewhere herein.

Figure 3:
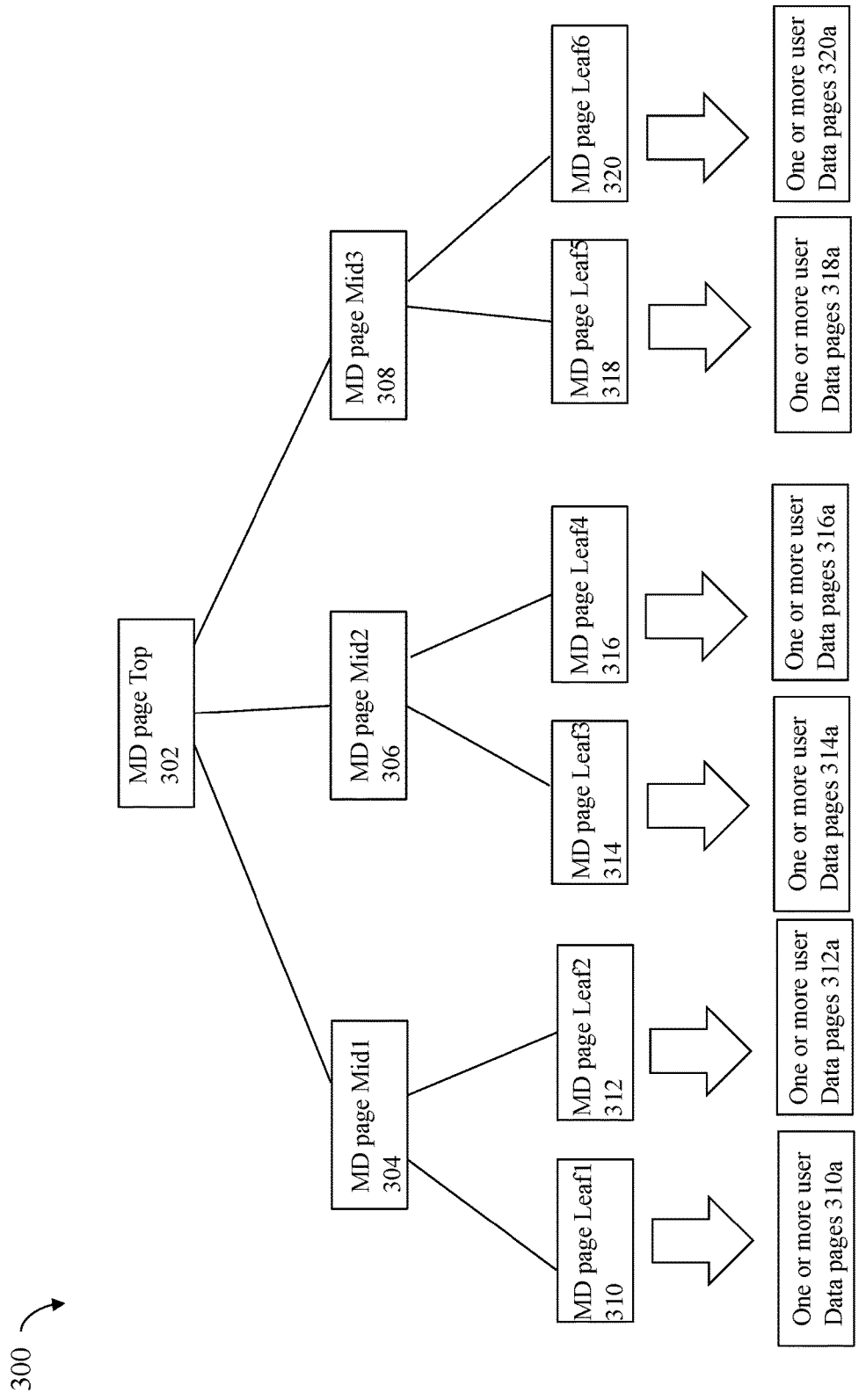
FIGS. 3, 4, 5 and 6 illustrate a data structure that may be used as mapping information or metadata location information in an embodiment in accordance with the techniques herein.

In at least one embodiment, the mapping information 1104 for a LUN may be in the form of a tree having a plurality of levels. More generally, the mapping information 1104 may be in the form of any ordered list or hierarchical structure. In at least one embodiment, the mapping information 1104 for a LUN, such as a LUN A, may include LUN MD in the form of a tree having 3 levels including a single top or root node, a single mid-level and a bottom level of leaf nodes, where each of the MD page leaf nodes may point to, or reference (directly or indirectly) one or more pages of stored data, such as user data stored on the LUN A. Each node in the tree may correspond to a MD page including MD for the LUN A. More generally, the tree or other hierarchical structure of various MD pages of the mapping structure 1104 for the LUN A may include any suitable number of levels, such as more than 3 levels where there are multiple mid-levels. In at least one embodiment the tree of MD pages for the LUN may be a B+ tree, also sometimes referred to as an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, the tree structure of MD pages, corresponding to the mapping information 1104 in at least one embodiment, is represented in FIG. 3 as including only 3 levels where each node in the tree may have at most 3 child nodes. Generally, the techniques herein may be used with any layered or hierarchical structure of MD pages.

Referring to FIG. 3, shown is an example of a tree of MD pages that may be used in an embodiment in accordance with the techniques herein. The example 300 includes a tree of MD pages denoting the mapping information or location MD 1104 implemented as a data structure as noted above with 3 levels—a top or root level, level 1, including a single MD page; a single mid or middle level, level 2, of MD pages; and a bottom level, level 3, of leaf nodes of MD pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which may also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages (e.g., pages of data stored on the LUN A). For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node may include a reference used to access (directly or indirectly) each of its one or more child nodes. For example, the root node MD page top 302 may include addresses or pointers used to access each of its child nodes 304, 306 and 308. The mid-level node MD page mid1 304 may include addresses or pointers used to access each of its child leaf nodes 310, 312. The mid-level node MD page mid1 306 may include addresses or pointers used to access each of its child leaf nodes 314, 316. The mid-level node MD page mid1 308 may include addresses or pointers used to access each of its child leaf nodes 318, 320.

In at least one embodiment, each of the addresses or pointers included in a MD page that references a location in another MD page or references a location in a UD page may be a physical storage location on the back-end PDs. Thus, the traversal between connected nodes of the structure 300 may correspond to traversing physical address or storage locations included in pages or nodes that are parent nodes.

In connection with accessing a particular UD page in at least one embodiment, all MD pages in a path from the root or top level of the tree to the UD page may be required to be traversed in a consecutive serialized order in which such pages appear in the path traversal down the path from the top or root level to the UD page accessed using a particular one of the MD page leaf nodes. For example, assume UD page X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 may generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

As noted elsewhere herein, the data pages 310*a*, 312*a*, 314*a*, 316*a*, 318*a* and 320*a* include UD stored on particular logical addresses of a LUN's address space, such as the LUN A's logical address space. In at least one embodiment each MD leaf may hold MD for a specified number of LBAs of a LUN. For example, in one embodiment each MD leaf may hold MD for 512 LBAs. For example, with reference to FIG. 3 and as noted elsewhere herein, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, element 310*a* denotes data pages for LBAs 0-511 and 312*a* denotes data pages for the LBAs 512-1023; element 314*a* denotes data pages for LBAs 1024-1535; element 316*a* denotes data pages for LBAs 1536-2047, and so on.

As generally known in the art, a depth-first traversal is an algorithm for traversing or searching tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree. In at least one embodiment, when the structure 300 is traversed in this depth first manner, the MD page leaf nodes that occur in the depth first traversal correspond to consecutive sequential LBA subranges of a LUN. However, the techniques described herein are not limited to any particular correspondence between the LUN LBAs and the different MD page leaves.

In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 may be known to include MD relevant for accessing data on a particular LUN and one or more LBAs of that LUN. For example, consistent with discussion above, element 310a denotes the data blocks for LBAs 0-511 of a LUN. In order to access the data block for an LBA of the LUN in the LBA subrange 0-511, MD pages 302, 304 and 310 may be traversed in sequential order. In particular, the first entry or offset of the MD page top 302 may contain the address of the MD page mid 1 304; the first entry or offset of the MD page mid 1 304 may contain the address of the MD page leaf 1 310; and the first entry or offset of the MD page leaf 1 310 may contain the address of the data blocks for 310a.

In a similar manner, a mapping may be made regarding what MD pages of the structure 300 and entries thereof are used in connection with obtaining data blocks containing data for any particular LUN and LBA. In at least one embodiment, the particular MD pages used to access a data block including data for a particular LUN and LBA may be known based on such mappings and correspondence of LBA subranges to particular MD leaf pages.

Figure 4:
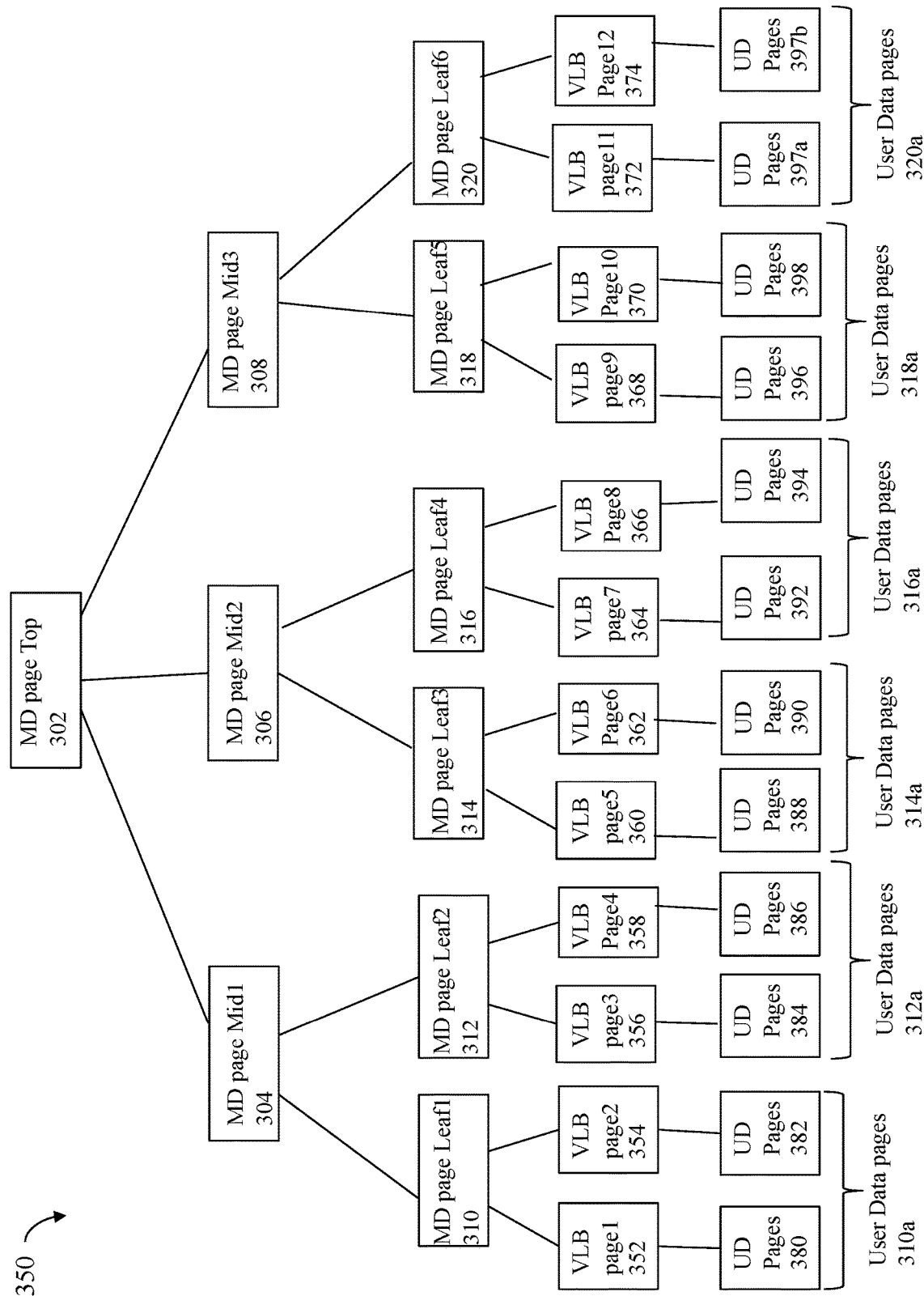

Referring to FIG. 4, shown is a more detailed version of a hierarchical structure used as the mapping information or location MD 1104 that may be used in an embodiment in accordance with the techniques herein. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages may be used to facilitate different data storage services, such as relocating UD between different physical storage location, data deduplication, and the like. An entry of the VLB associated with a particular physical storage location may be remapped without requiring remapping of a MD leaf to the UD page.

The UD pages 380 and 382 denote two portions of UD pages corresponding to UD pages 310a of FIG. 3 including data for LBAs 0-511. UD pages 384 and 386 denote two portions of UD pages corresponding to UD pages 312a of FIG. 3 including data for LBAs 512-1023. UD pages 388 and 390 denote two portions of UD pages corresponding to UD pages 314a of FIG. 3 including data for LBAs 1024-1535. UD pages 392 and 394 denote two portions of UD pages corresponding to UD pages 316a of FIG. 3 including data for LBAs 1536-2047. UD pages 396 and 398 denote two portions of UD pages corresponding to UD pages 318a of FIG. 3 including data for LBAs 2048-2559. UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
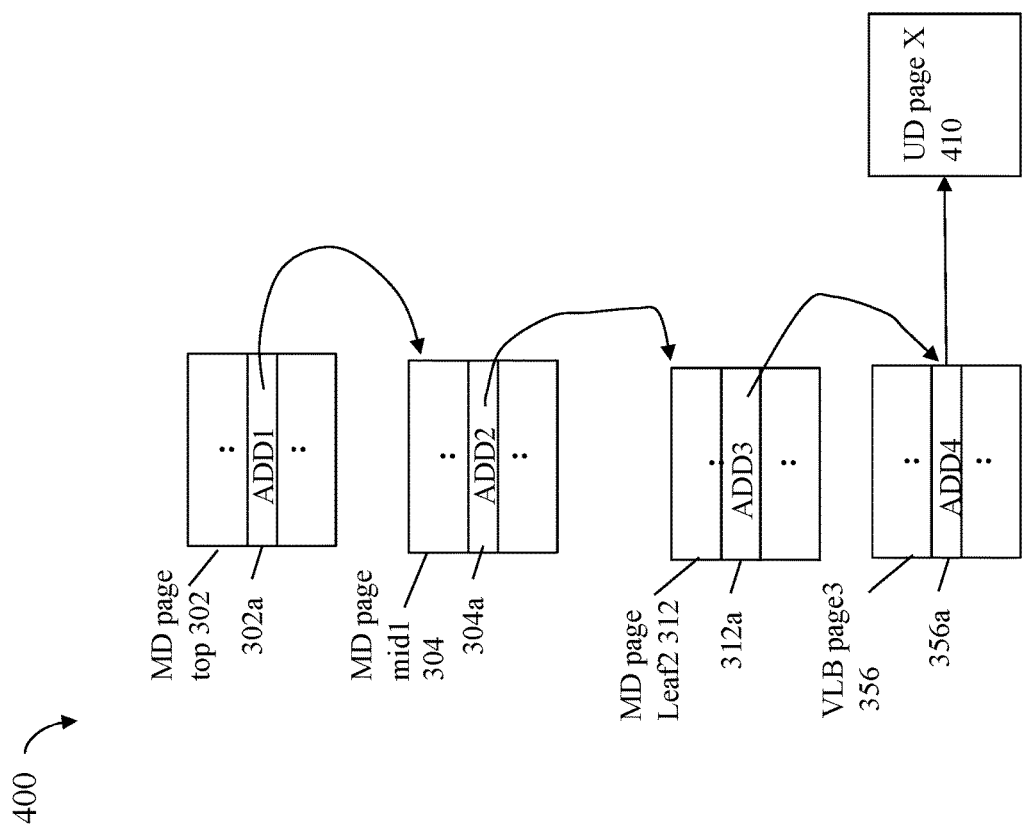

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence may be determined based on the logical address including the desired UD. For example, assume processing is performed to read the UD for LUN A, LBA 514 located in UD page X. In at least one embodiment, the logical address LUN A, LBA 514 may be used to determine the particular structure instance and thus the particular MD page top 302 to access. The LBA 514 of the logical address of the UD may also be used to determine an index or offset into the MD page 302 to determine the relevant entry, location or address 302a having a pointer, address or reference to the next MD page in the sequence to access the desired page including the UD for LUN A, LBA 514. An embodiment generally may use any suitable technique to map a corresponding logical address, such as an LBA of a particular LUN, to an entry in the top level MD page 302.

The MD page top 302 may be accessed and read from a PD to obtain the address or pointer ADD1 from location 302a. If the MD page 302 is already in cache, the cached copy may be used to obtain the address or pointer ADD1 from the location 302a. The address or pointer ADD1 of location 302a may then be used to identify a particular mid level MD page, such as MD page mid1 304, that is accessed next in the sequence.

Continuing with the example 400, the MD page mid1 304 may be accessed where the location 304a is read to obtain the address or pointer ADD2 from location 304a. The address or pointer ADD2 may then be used to identify a particular leaf level MD page, such as MD page leaf2 312, that is next accessed in the sequence. If the MD page mid1 304 is not in cache, the on-disk copy of the MD page 304 on a PD may be accessed to read the address or pointer ADD2 from the location 304a. The address or pointer ADD2 identifies location 312a of the MD page leaf 2 312. If the MD page 312 is not already in cache, the on-disk copy of the MD page 312 on a PD may be read to obtain the content of location 312a. The location 312a of the MD page leaf2 312 may be accessed and read to obtain the address or pointer ADD3 from location 312a. The address or pointer ADD3 may then be used to identify a particular entry of a VLB page, such as entry 356a of the VLB page3 356, that is next accessed in the sequence. Thus, ADD3 may denote the location or address of the entry 356a in the VLB page 3 356.

If the VLB page 356 is not already in cache, the on-disk copy of the VLB page 356 on a PD may be read to obtain the content of location 356a. The location 356a of the VLB page 3 356 may be accessed and read to obtain the address or pointer ADD4 from the location 356a. The address or pointer ADD4 may then be used to identify the particular UD page X 410 where the UD page X may next be read. If the UD page X is not in cache, the on-disk copy of the UD page X may be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
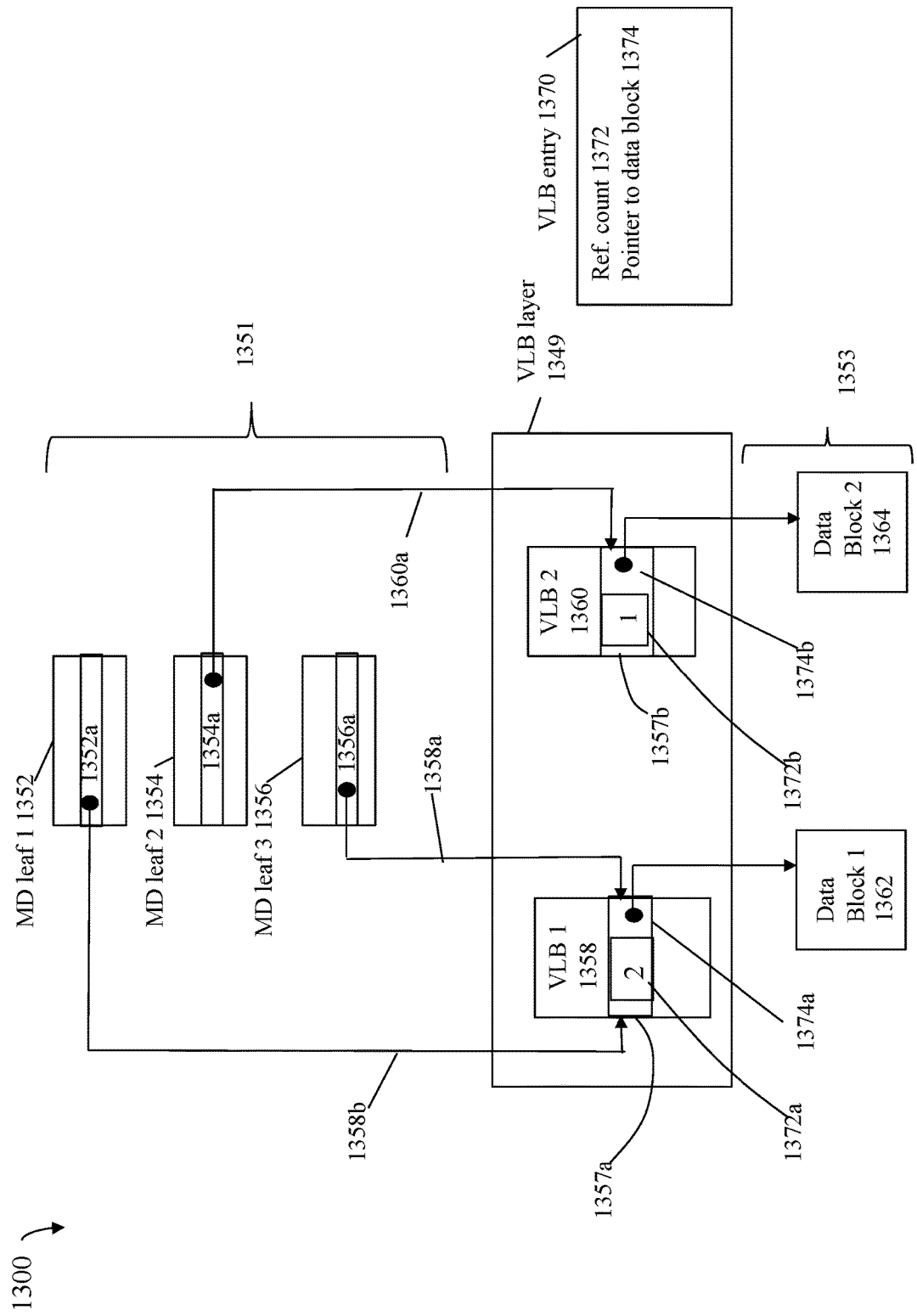

Referring to FIG. 6, shown is an example illustrating in more detail a particular embodiment in which a VLB layer of multiple VLBs is the intervening layer between the MD leaf nodes of the mapping information 1104 and the data blocks. Elements 1352, 1354 and 1356 may denote 3 MD leaf nodes as may be included in the mapping information 1104 illustrated in FIGS. 2C, 3, 4 and 5. Elements 1358 and 1360 denote 2 VLBs included in the VLB layer 1349 between MD leaf nodes 1351 and data blocks 1353. The VLB layer 1349 may denote the VLB structures as described in connection with the FIGS. 3, 4 and 5. Elements 1362 and 1364 denote 2 data blocks.

In the example 1300, MD leaf nodes 1352 and 1356 both indirectly reference the same data block 1362 through the same VLB 1358. The two MD leaf nodes 1352 and 1356 both referencing the same data block 1362 may be a mapping resulting from data deduplication processing. In particular, the MD leaf entry 1352a of the MD leaf 1352 points to or references the VLB entry 1357a of the VLB 1358; and the MD leaf entry 1356a of the MD leaf 1356 points to or references the VLB entry 1357a of the VLB 1358. In the example 1300, MD leaf node 1354 points to VLB 1360 whereby the VLB 1360 points to the data block 1364. In particular, the MD leaf entry 1354a of the MD leaf 1354 points to or references the VLB entry 1357b of the VLB 1360. The data blocks 1362, 1364 may denote user data blocks as described herein (e.g., data blocks storing user data of UD pages as illustrated in the FIGS. 3, 4 and 5)

The elements 1358a, 1358b each denote a pointer to, or address of, an entry in the VLB 1358 used in connection with obtaining the data block 1362 stored on a particular LUN and LBA of the LUN. In at least one embodiment, the VLB 1358 may denote a VLB page or node as described herein. Thus, in such an embodiment, each of the virtual or indirect pointers 1358a, 1358b may be pointers to the VLB entry 1357a of the VLB structure 1358. The VLB entry 1357a of the VLB structure 1358 may further include a field 1374a that is a pointer to, or address of, the user data block 1362. Additionally, the VLB entry 1357a of the VLB structure 1358 may also include other information such as a reference count (ref count) 1372a denoting a counter of the number of references or pointers to the VLB entry 1357a by MD leaf nodes. In this example, the ref count 1372a is 2 denoting the 2 references or pointers 1358a, 1358b to the entry VLB 1357a, respectively, by the MD leaf entry 1352a of the MD leaf 1 1352 and by the MD leaf entry 1356a of the MD leaf3 1356.

The element 1360a denotes a pointer to, or address of, an entry in the VLB 1360 used in connection with obtaining the data block 1364 stored on a particular LUN and LBA of the LUN. The pointer 1360a may be used as the virtual or indirect pointer in connection with obtaining the data block 1364. In at least one embodiment, the VLB 1360 may denote a VLB page or node as described herein. Thus, in such an embodiment, the virtual or indirect pointer 1360a may be a pointer to the VLB entry 1357b of the VLB structure 1360. The VLB entry 1357b of the VLB structure 1360 may further include a field 1374b that is a pointer to, or address of, the user data block 1364. Additionally, the VLB entry 1357b of the VLB structure 1360 may also include other information such as a reference count (ref count) 1372b denoting the number of references or pointers to the VLB entry 1357b by MD leaf nodes. In this example, the ref count 1372b is 1 denoting the single reference or pointer 1360a to the VLB entry 1357b by the MD leaf entry 1354a of the MD leaf 2 1354.

Consistent with the discussion above in connection with FIG. 6, the element 1370 provides a general illustration of information that may be included in each VLB entry of a VLB node or page. For example, the element 1370 denotes information that may be included in each of the VLB entries 1357a and 1357b. Each VLB entry 1370 may include a ref count 1372, a pointer to a data block 1374, and possibly other information that may vary with embodiment.

As noted above, in the example 1300, MD leaf nodes 1352 and 1356 both indirectly reference the same data block 1362 through the same VLB 1358. The two MD leaf nodes 1352 and 1356 both referencing the same data block 1362 may be a mapping resulting from data deduplication processing. In at least one embodiment each MD leaf may map to a 2 MB (megabyte) chunk of stored user data which may correspond to 512 contiguous logical blocks or logical address of a LUN. Thus each MD leaf may correspond to a different 512 logical address range of a LUN. For example, the MD leaf 1352 may correspond to a first LBA range of the LUN X1 and the MD leaf 1356 may correspond to a different second LBA range of the LUN X1 or possibly a different LUN X2. In particular the MD leaf entry 1352a of the MD leaf 1352 may be mapped to LBA A1 where the entry 1352a is used to indirectly obtain the data block 1362 stored at LBA A1; and the MD leaf entry 1356a of the MD leaf 1356 may be mapped to LBA A2 where the entry 1356a is used to indirectly obtain the data block 1362 stored at LBA A2.

Data deduplication processing may have been performed which determined that the contents of the same data block 1362 is stored at both LBA A1 and LBA A2 resulting in the structures as illustrated in the example 1300 of FIG. 6.

In at least one embodiment, the data storage system may implement a log structure for processing write I/Os, such as writes received from hosts or other clients that store user data (UD) on the data storage system. A write I/O that writes user data to a target logical address may be received from a host and written as a record or entry in a log file. Generally, write I/Os are recorded and written sequentially and contiguously to the log file. For example, information recorded in an entry of the log for a write I/O may identify the target logical address (e.g., LUN and LBA) written to, the content or value written to the target logical address, and possibly other information. The associated data recorded in each record of the log file for a write I/O may vary with embodiment. The log file may be persistently stored on non-volatile storage. Thus, generally each received write I/O may be recorded or logged in the next logically sequential record of the file. Once the last record of the log file has been written to, the logging of write I/Os may continue by logging the next write I/O in the first record of the log file. The foregoing may be repeated in a continuous manner. At some point after write I/Os are recorded in the log file, the logged write I/Os as recorded in entries of the log file may be flushed to the BE PDs providing non-volatile BE storage for the various target logical addresses of the write I/Os. The flushing of a record of a write I/O that writes first data to a target logical address may include storing the first data to a physical storage location on a BE PD mapped to the target logical address and also updating MD associated with the target logical address or location. The log file may be managed so as ensure that an entry or record of the log file is not overwritten prior to flushing the write I/O of the entry or record to the BE PDs. In at least one embodiment, after the write I/O is initially recorded in the log file, the location MD or mapping information associated with the target logical address may reference a location in the log file, where the location denotes the current value or content stored at the target logical address. The current value or content may be the data written by the write I/O. Subsequently, when the record of the write I/O is flushed from the log file, the current value or content for the target logical address is written to a physical storage location on the BE PDs. Additionally, the location MD or mapping information for the target logical address is also updated and mapped to the physical storage location containing the current value or content for the target logical address.

In at least one embodiment, data deduplication processing may be performed when a record of the log file is flushed. For example, assume at a first point in time that the data block 1362 is a target data block having content stored at the logical address LBA A2 associated with the MD leaf entry 1356a. Subsequently, at a second point in time when flushing the record for the write I/O that writes to LBA A1 as noted above, deduplication processing may be performed that determines the content written to the LBA A1 matches the content of the target data block 1362. As discussed above, when flushing a record of the log file for a logged write I/O that writes to a target logical address, updates are made to the BE PD location corresponding to the target logical address. Additionally, when flushing the record of the log file for the logged write I/O that writes to the target logical address, updates are generally made to MD associated with the target logical address. In particular, the location MD or mapping information associated with the target logical address is updated when flushing the log file record. For example, the MD leaf and VLB page or structure associated with the target logical address may be updated to map to the particular data block (e.g., physical location) having contents stored at the target logical address. For example, when flushing the record for the write I/O that writes to LBA A1 as noted above, MD leaf entry 1352a may be updated to point (1358b) to the VLB entry 1357a, and the VLB entry 1357a may be updated to point, or reference, the data block 1362. In an embodiment performing data deduplication such as part of ILD, information of a VLB page or structure associated with the target logical address may also be updated. For example, when flushing the record for the write I/O that writes to LBA A1 as noted above, deduplication processing may be performed that determines the content written to the LBA A1 matches the content of the target data block 1362 and it may necessary to update the ref count of the entry 1357a, such as by incrementing the ref count of 1357a from 1 to 2 (e.g., assuming that prior to flushing the record for the write I/O to LBA A1, another write I/O had written the contents stored in the data block 1362 to the logical address LBA A2 associated with the MD leaf entry 1356a that points to the VLB entry 1357a). The collective updates made to both the MD and BE PD location associated with the target location of the flushed write I/O record may be performed atomically as a single transaction to maintain consistency and integrity of the MD and user data.

Consistent with other discussion herein, updating the VLB and other MD of the mapping information or structures (e.g., as described in FIGS. 3, 4, 5, and 6) may be performed by multiple nodes in an active-active configuration, such as nodes A and B of FIG. 2B. In such an embodiment in which both nodes A and B operate in an active-active manner to service I/Os, the same pages of MD may be accessed and modified by both nodes. In particular, both nodes A and B may have separate per node caches and the same pages of MD may be concurrently stored in the caches of both nodes. For example, node A may have a first cached copy of a VLB page and node B may have a second cached copy of the same VLB page. A synchronization technique, such as locking may be used to preserve the data integrity of the VLB page, for example, when both nodes attempt to modify the same VLB page. For example, assuming node A needs to update its first cached copy of the VLB page, node A may obtain an exclusive use or write lock on the VLB page, whereby node B is notified of the exclusive use or write lock by node A and node B does not access its second cached copy of the VLB page while node A holds the exclusive use or write lock on the VLB page. Once the node A is done with its update to the first cached copy of the VLB page, node A may release the lock and so notify node B. Additionally, when node A modifies its first cached copy of the VLB page, it is necessary to use a cache management technique to ensure that node B does not subsequently use its now stale second cached copy of the same VLB page.

In at least one system, after node A updates its first cached copy of the VLB page, node A may send a message to node B instructing node B to invalidate its second cached copy of the VLB page. In response to receiving the message, node B may invalidate its second cached copy of the VLB page. Invalidating cached data, such as the second cached copy of the VLB page, stored at a cache location may include marking that cache location as available for use in any suitable manner and evicting the now stale or outdated second cached copy of the VLB page from node B's cache. As a result of invalidating the second cached copy of the VLB page in node B's cache, node B's cache no longer includes a valid or usable copy of the VLB page. Thus invalidating the second cached copy of the VLB page on node B may result in subsequent decreased performance since the next subsequent reference by node B to the VLB page results in a cache miss on node B. In response to the cache miss, node B may read the VLB page into its cache, such as from a BE PD or other form of non-volatile media typically having a slower access time than the cache. The cache miss may be triggered by a host or user read I/O sent to node B, where the read I/O's response time is now increased in comparison to an I/O response time achieved if the VLB page needed for the read I/O was already in node B's cache (e.g. cache hit experienced for the VLB page rather than a cache miss). In connection with data deduplication in which a candidate data block is found to be a duplicate of an existing target data block, the candidate data block is deduplicated (deduped) and the VLB entry reference counter associated with the target data block may be incremented by 1. In this case, each time a candidate data block is found to be a duplicate of a target data block by node A, where the target data block is referenced by a first VLB page, the node A sends a request to the other peer node B to invalidate any copy of the first VLB page in its cache.

Thus, the subsequent cache miss for the first VLB page on the other peer node B may potentially occur with each deduped candidate data block on the one node.

It should be noted that the foregoing of invalidating cached contents is described in the context with respect to MD such as the VLB page. More generally, the invalidation request may be sent between nodes with respect to any cached data in connection with synchronizing cached content across multiple nodes. Thus, the problem of decreased performance as a result of a subsequent cache miss for the invalidated VLB page more generally may result in connection with any invalidated cached data.

Described in the following paragraphs are techniques that may be used to improve the cache hit rate and thus performance of a data storage system. In at least one embodiment, rather than have node A send a request to node B to invalidate its cached data in connection with maintaining cache coherency among the nodes, node A may send updated data to node B. In at least one embodiment, the updated data may be sent to node B as an alternative to the invalidate request in accordance with one or more criteria. For example, in at least one embodiment, the criteria may indicate to send updated data, rather than the invalidate request, when the amount of data modified (delta) by node A is less than a specified threshold size. In at least one embodiment, node A may send to node B the modified content or data updates without sending the unchanged content. For example, if node A only updates the ref count of a VLB entry of the VLB page, then node A may only send the updated ref count to node B without sending the remaining unchanged content of the VLB entry including the updated ref count.

In at least one embodiment, the criteria may indicate to send the updated data, rather than an invalidate request, under other specified conditions such as when it is critical for node B to have an updated cache and not experience a subsequent cache miss. For example, the VLB page or other cached page that has been modified may be associated with a performance critical application, LUN, or host. In such a case, in order to avoid any possible subsequent cache miss on node B resulting in performance degradation, the updated data may be sent from node A to node B rather than an invalidate request.

The updated data that is sent, rather than an invalidate request, may be determined using any suitable technique. Additionally, the updated data may be sent in any suitable form. The updated data may be determined based on a difference or comparison to the current cached page. In at least one embodiment, the difference may be determined using a logical exclusive OR (XOR) of the original data (before updating) and the updated data. In particular, the processing may include determining the bitwise XOR between the original data and the updated data, where the result of the XOR operation has a 0 (zero) in a bit position if the bit value of the bit position in the original and updated data is the same, and otherwise has a 1 (one) in the bit position if the bit value of the bit position in the original and updated data is different. In such an embodiment, all matching corresponding bits of the original and updated data have a 0 in the result, and all non-matching corresponding bits of the original and updated data have a 1 in the result. In at least one embodiment, those bit positions in the updated data having a 1 in the result may denote the updates or changes. For example, if the original data has a bitwise representation of "1111" and the updated data has a bitwise representation of "1110", the logical XOR of the foregoing computes a result of "0001" denoting that only the last, rightmost or 4th bit position of the original data and the updated data does not match (e.g., the remaining preceding or first 3 bit positions of the original data and updated data match). In at least one embodiment, the result of the foregoing XOR operation may be sent from the node A to the node B to denote the changes to be made to the original data such as stored in the node B's cache. In such an embodiment, the result includes a 1 in those bit positions that have been updated or changed. The receiving node, such as node B, may flip or negate the bit positions of the original data having a corresponding bit position in the result with a value of 1. For example, if bit position 3 of the result is 1 and bit position 3 of the original data is 1, the receiving node changes the bit position 3 of the original data from 1 to 0 to obtain the data modification to bit 3. For example, if bit position 4 of the result is 1 and bit position 4 of the original data is 0, the receiving node changes the bit position 4 of the original data from 0 to 1 to obtain the data modification to bit 4. The receiving node already has the original data in its cache and may use the bit positions of the result having a value of 1 as flags denoting the particular bit position of the original data to flip or negate.

As a variation, in at least one embodiment, the result (of the XOR between the original and updated data) may be compressed, where the compressed form of the result may be sent from the sending node to the receiving node. The receiving node may then decompress the received data to obtain the result of the XOR. The result includes a 1 in those bit positions that have changed. Consistent with discussion above, the receiving node may flip or negate the bit positions of the original data having a corresponding bit position in the result with a value of 1. For example, if bit position 3 of the result is 1 and bit position 3 of the original data is 1, the receiving node changes the bit position 3 of the original data from 1 to 0 to obtain the data modification to bit 3. For example, if bit position 4 of the result is 1 and bit position 4 of the original data is 0, the receiving node changes the bit position 4 of the original data from 0 to 1 to obtain the data modification to bit 4. The receiving node already has the original data in its cache and may use the bit positions of the result having a value of 1 as flags denoting the particular bit position of the original data to flip or negate.

In at least one embodiment using log files of recorded write I/Os, deduplication processing may be performed when a record for a logged write I/O is flushed from the log file. For example, consider flushing a log record for a write I/O that writes first data to a target logical address. If the first data is determined by deduplication processing not to be a duplicate of existing content already stored in an existing physical location or existing target data block, then a new data block is allocated, the first data is stored in the new data block, a new VLB entry points to the new data block, and the MD leaf entry associated with the target logical address is updated to point to or reference the new VLB entry. Also, other information of the new VLB entry may be initialized or updated. For example, the ref count of the new VLB entry is set to 1 (one) for the single reference by the MD leaf entry associated with the target logical address. Thus, as a single atomic transaction, processing may include updating the newly allocated data block of the BE PD to store the first data, and updating MD associated with the target logical address. The MD updated may include the mapping information or location MD for the target logical address. In at least one embodiment, the MD updated may include updating the MD leaf entry of the MD leaf associated with the target logical address. The MD updated may also include updating a VLB entry of a VLB that points to or references the physical location of the BE PD.

On the other hand, if the first data is determined by deduplication processing to be a duplicate of existing content already stored in an existing physical location or existing target data block referenced by an existing VLB entry, then the MD leaf entry associated with the target logical address is updated to point to or reference the existing VLB entry. Also, other information of the existing VLB entry may be updated. For example, the ref count of the existing VLB entry referencing the existing target data block may be incremented by 1 (one) to account for the additional reference by the MD leaf entry associated with the target logical address. Thus as a single atomic transaction, processing may include updating the MD associated with the target logical address. The MD updated may include the mapping information or location MD for the target logical address. In at least one embodiment, the MD updated may include updating the MD leaf entry associated with the target logical address to reference the existing VLB entry that references the existing target block. The MD updated may also include updating (e.g., incrementing) the ref count of the VLB entry that references the existing target data block.

In at least one embodiment, multiple processing flows may modify the mapping information or MD location information as described herein. For example, the mapping information or MD location information may be modified when writing new candidate data blocks of user data, when performing data deduplication, when performing garbage collection, when deleting user data stored at a logical address, and the like.

Modifications or updates to the mapping information or MD location information may be performed by a MD modification component. In at least one embodiment, each node may have a MD modification component. The MD modification component may provide locking management and synchronized updates to the MD structures across all nodes, and may provide for consistency and coherency of cached MD across all nodes. The MD modification component may provide transactional protection by atomically performing multiple MD modifications and writing the BE PDs, as may be needed, when flushing a record of a logged write I/O.

The foregoing and other aspects are described in more detail in the following paragraphs.

Figure 7A:
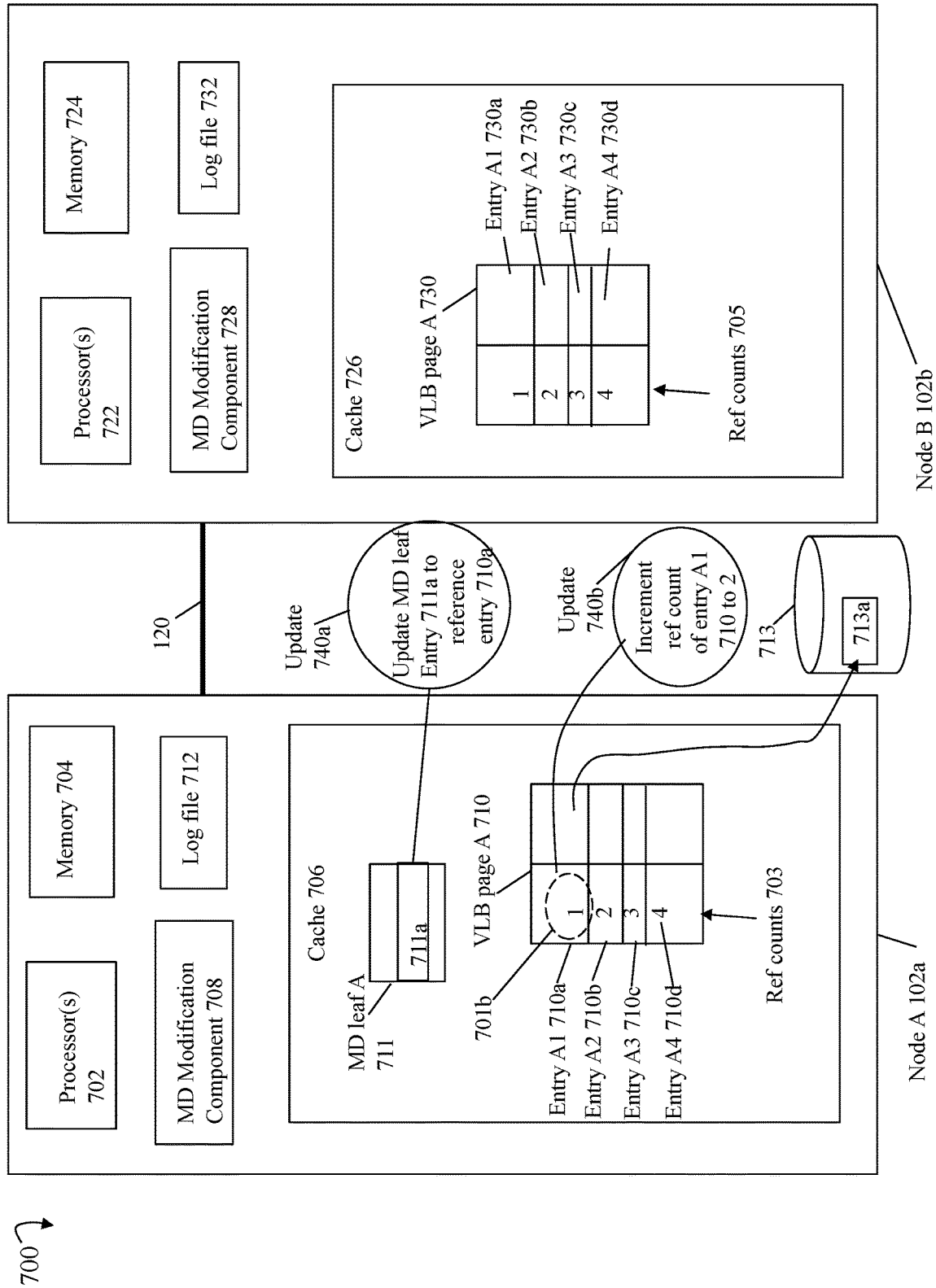
FIGS. 7A, 7B and 7C are examples illustrating use of the techniques herein with two nodes.

Referring to FIG. 7A, shown is an example of components that may be included in an embodiment in accordance with the techniques herein. The example 700 provides further detail regarding the processing nodes 102a, 102b as described above in connection with the FIG. 2A. The example 700 may illustrate the state of the particular components at a first point in time. The node A 102a includes the processors 702, the memory 704, the cache 706, the MD modification component 708, and the log file 712. The node B 102b includes the processors 722, the memory 724, the cache 726, the MD modification component 728, and the log file 732.

The log files 712 and 732 may be used to log write I/Os as described above. In this example, the log file 712 may include records of logged write I/Os received by the node A 102a; and the log file 732 may include records of logged write I/Os received by the node B 102b.

The MD modification components 708, 728 handle processing performed when updating the MD structures, such as the mapping information or MD location information as described above in connection with the FIGS. 3-6. For example, the MD modification components 708, 728 may perform processing that updates the MD structures as needed when flushing records, respectively, from the log files 712, 732. Additional detail regarding processing performed by the MD modification components 708, 728 is described elsewhere herein.

The cache 706 of the node 102a includes a MD page denoted as VLB page A 710. The VLB page A 710 may be a VLB structure or page similar to VLBs as described above, such as, for example VLB 1358 and VLB 1360 of FIG. 6. The VLB page A 710 in this example includes only 4 entries 710a-d for simplicity of illustration. The entries 710a-d, respectively, include the ref count values 703 of 1, 2, 3 and 4. Consistent with discussion above, the ref counts 703 may denote the ref counts for such entries 710a-d similar to the ref count 1372 as described in connection with FIG. 6. The VLB entry 710a references the existing target data block 713a stored on the BE PD 713.

The cache 726 of the node 102b also includes the same VLB page A where the copy of the VLB page A stored in the cache 726 is denoted by element 730. The content of the VLB page A 710 in the cache 706 and the copy of the VLB page A 730 in the cache 726 are synchronized and include the same content at the first point in time. At the first point in time, the content of the entries 730a-d of the VLB page 730 match, respectively, the content of the entries 710a-d of the VLB page 710.

Also at the first point in time, the MD leaf A 711 including the MD leaf entry is only in the cache 706 of the node 102a but not the cache 726 of the node 102b. The MD leaf entry 711a may be associated with a first target logical address, TA1.

At a second point in time subsequent to the first point in time, assume that node A 102a performs processing to flush a record of the log file 712, where the record includes a write I/O that writes a first candidate data block to the first target logical address TA1. Also assume that deduplication processing is performed and the contents of the first candidate data block is determined to be a duplicate of the existing target block 713a associated with the VLB entry 710a. In connection with the deduplication processing, various MD structures associated with the first target logical address TA1 are updated. Consistent with discussion above, a first MD update 740a and a second MD update 740b may be performed for the deduplication. The first MD update 740a may include updating the MD leaf entry 711a (that is associated with the first target logical address TA1) to reference the VLB entry 710a. Also in connection with deduplicating the first candidate block as a duplicate of the existing target data block 713a, the reference count 701b of the entry 710a is incremented from 1 to 2.

Consistent with other discussion herein, the MD modification component 708 may perform processing to implement the updates 740a and 740b as a single atomic transaction in order to provide data integrity and correctness. As a first step S1, the MD modification component 708 may obtain write or exclusive use locks on the MD leaf A 711 and the VLB page A 710. In at least one embodiment, the nodes 102a-102b may use the interconnect 120 for internode communication in implementing the foregoing locking. When the component 708 of the node A 102a obtains the locks on the MD leaf A and the VLB page A, the peer node B does not read or write any data of the MD leaf A and the VLB page A, including any cached copies of such locked pages that may reside in the cache 726 of the node B 102b.

Figure 7B:
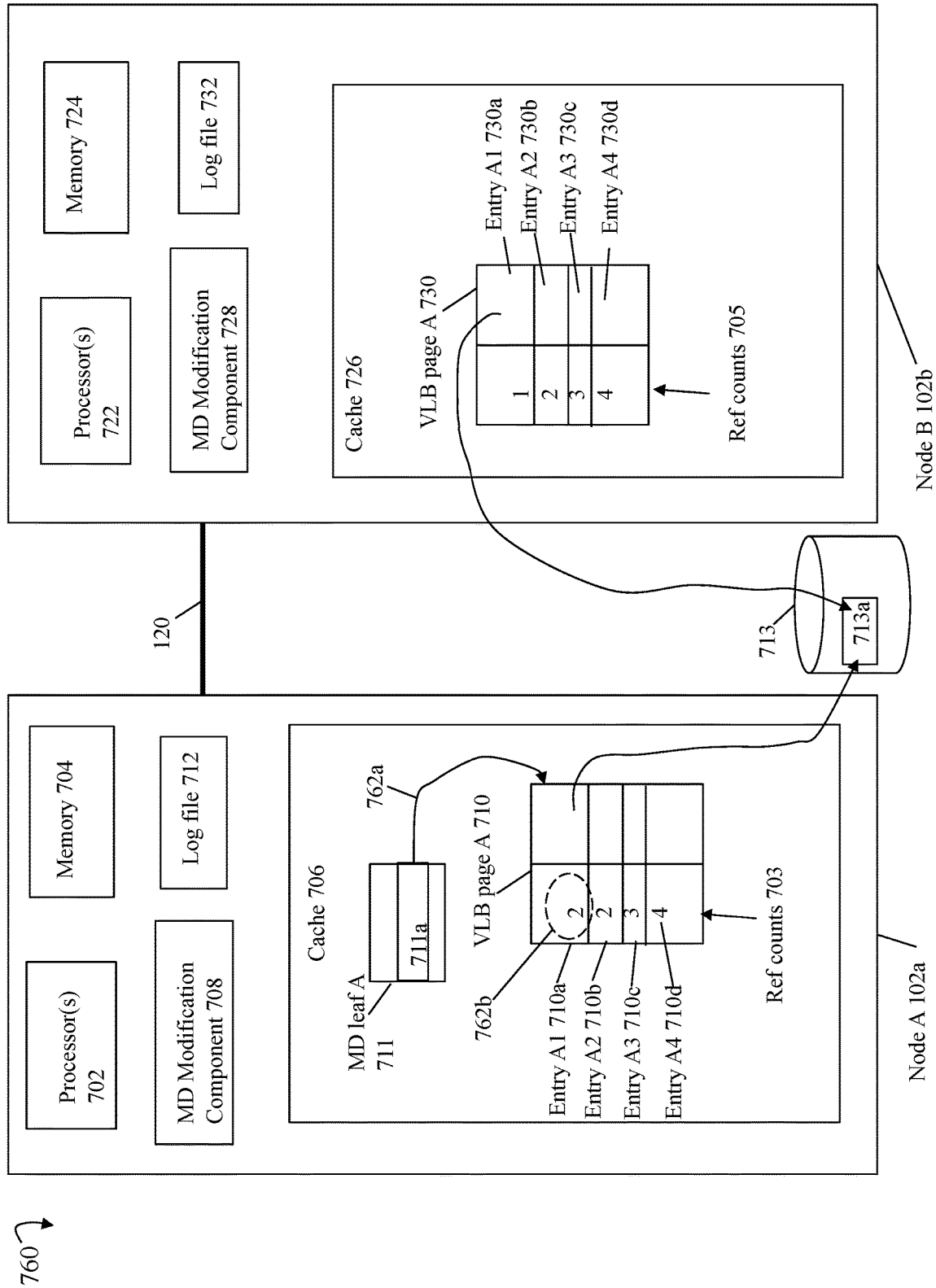

Following the step S1, a step S2 may be performed in which the cache 706 of the node 102a is updated by applying the updates 740a-b to the cached copies of the MD leaf A 711 and the VLB page A 710. Referring to FIG. 7B, shown is an example 760 illustrating the state of the cache 706 after the updates 740a and 740b have been applied. In particular, the arrow 762a denotes the application of the update 740a, where the MD leaf entry 711a is updated to reference the VLB entry A1 710a. The element 762b denotes the application of the update 740b, where the ref count of the MD leaf entry 711a is incremented from 1 to 2.

Following the step S2, a step S3 may be performed by the node 102a, such as by the component 708. The step S3 processing may include determining, in accordance with one or more criteria, whether to perform the step S3A and send information describing the updates 740a, 740b from the node 102a to the node 102b, or whether to perform the step S3B send a request from the node 102a to the node 102b requesting that the node 102b invalidate any cached copies of the MD leaf A and the VLB page A.

In at least one embodiment, the one or more criteria may include determining the size of the update message or data denoting the update to be made to a cached page. For example, in at least one embodiment, the criteria may indicate to send updated data, rather than the invalidate request, when the amount of data modified (delta) by node A is less than a specified threshold size.

In at least one embodiment, the one or more criteria may indicate to send the updated data, rather than an invalidate request, under other specified conditions such as when it is critical for node B to have an updated cache and not experience a subsequent cache miss. For example, the VLB page or other cached page that has been modified may be associated with a performance critical application, LUN, or host. In such a case, in order to avoid any possible subsequent cache miss on node B resulting in performance degradation, the updated data may be sent from node A to node B rather than an invalidate request.

In at least one embodiment in accordance with the techniques herein, the initiating node, such as node A 102a, is able to determine the updates to be applied since, for any page where there is a first copy of the page in the node B's cache 726 and a second copy of the page (e.g., prior to performing the update) in the node A's cache 706, the first copy and the second copy match.

In at least one embodiment, the step S3 may include determining the page update (e.g., delta) to be sent based on a difference or comparison to the current cached page. In at least one embodiment, the difference may be determined using a logical exclusive OR (XOR) of the original data (before updating) and the updated data. In particular, the processing may include determining the bitwise XOR between the original data and the updated data, where the result of the XOR operation has a 0 (zero) in a bit position if the bit value of the bit position in the original and updated data is the same, and otherwise has a 1 (one) in the bit position if the bit value of the bit position in the original and updated data is different. In such an embodiment, all matching corresponding bits of the original and updated data have a 0 in the result, and all non-matching corresponding bits of the original and updated data have a 1 in the result. In at least one embodiment, those bit positions in the updated data having a 1 in the result may denote the updates or changes. For example, if the original data has a bitwise representation of "1111" and the updated data has a bitwise representation of "1110", the logical XOR of the foregoing computes a result of "0001" denoting that only the last, rightmost or 4th bit position of the original data and the updated data does not match (e.g., the remaining preceding or first 3 bit positions of the original data and updated data match). In at least one embodiment, the result of the foregoing XOR operation may be sent from the node A to the node B to denote the changes to be made to the original data such as stored in the node B's cache. In such an embodiment, the result includes a 1 in those bit positions that have been updated or changed. The receiving node, such as node B, may flip or negate the bit positions of the original data having a corresponding bit position in the result with a value of 1. For example, if bit position 3 of the result is 1 and bit position 3 of the original data is 1, the receiving node changes the bit position 3 of the original data from 1 to 0 to obtain the data modification to bit 3. For example, if bit position 4 of the result is 1 and bit position 4 of the original data is 0, the receiving node changes the bit position 4 of the original data from 0 to 1 to obtain the data modification to bit 4. The receiving node already has the original data in its cache and may use the bit positions of the result having a value of 1 as flags denoting the particular bit position of the original data to flip or negate. In such an embodiment, the criteria may indicate to perform the step S3A and send the update, that is the result (of the XOR of the original and updated data), only if the size (e.g., number of bytes or bits) of the update is less than a specified threshold or maximum size. Otherwise, the criteria may indicate to perform the step S3B and send an invalidate request.

As a variation, in at least one embodiment, the step S3 for determining the update may include determining the result (of the XOR between the original and updated data) and then compressing the result, where the compressed form of the result may be sent from the sending node to the receiving node. The receiving node may then decompress the received data to obtain the result of the XOR. The result includes a 1 in those bit positions that have changed. Consistent with discussion above, the receiving node may flip or negate the bit positions of the original data having a corresponding bit position in the result with a value of 1. For example, if bit position 3 of the result is 1 and bit position 3 of the original data is 1, the receiving node changes the bit position 3 of the original data from 1 to 0 to obtain the data modification to bit 3. For example, if bit position 4 of the result is 1 and bit position 4 of the original data is 0, the receiving node changes the bit position 4 of the original data from 0 to 1 to obtain the data modification to bit 4. The receiving node already has the original data in its cache and may use the bit positions of the result having a value of 1 as flags denoting the particular bit position of the original data to flip or negate. In such an embodiment, the criteria may indicate to perform the step S3A and send the update, that is the compressed form of the result, only if the size (e.g., number of bytes or bits) of the update is less than a specified threshold or maximum size. Otherwise, the criteria may indicate to perform the step S3B and send an invalidate request.

In at least one embodiment in the step S3, the update may be determined and evaluated separately for each of the modifications. For example, an embodiment may determine and evaluate the update 740a based on the one or more criteria to determine whether to perform the step S3A or S3B with respect to the update 740a. An embodiment may determine and evaluate the update 740b based on the one or more criteria to determine whether to perform the step S3A or S3B with respect to the update 740b.

On the receiving node, such as node B 102b, when the step S3B is performed and an invalidate request is received to invalidate a cached page of data stored in its cache 726, the node B 102b evicts or removes the cached page of data from its cache 726. If the page is not in the cache 726, the invalidate request is ignored. Alternatively, when the step S3A is performed and the node B 102*b* receives a request to update a page, if the page is stored in node B's cache 726, the page is updated based on the updated information of the request. Otherwise, if the page to be updated is not stored in node B's cache 726, the update request is ignored.

In connection with the example 760, assume that processing of the step S3 by the node A 102*a* determines that the size of the update 740*a* to the MD leaf A 711 is less than the specified threshold maximum size and the step 3A is performed where the update 740*a* is sent from the node 102*a* to the node 102*b*. When the node 102*b* receives the update, the node 102*b* may examine its cache 726 and determine that the page MD leaf A is not stored in the cache 726, whereby the update 740*a* is ignored.

In connection with the example 760, assume that processing of the step S3 by the node A 102*a* determines that the size of the update 740*b* to the VLB page A 710 is less than the specified threshold maximum size and the step 3A is performed where the update 740*b* is sent from the node 102*a* to the node 102*b*. When the node 102*b* receives the update, the node 102*b* may examine its cache 726 and determine that a copy of the VLB page A, denoted as element 730, is stored in the cache 726. In this case with reference to FIG. 7C, the update 740*b* is applied to the VLB page A 730, where the ref count 782 of the VLB entry 730*a* is incremented from 1 to 2

Subsequent to performing the third step S3 and then either the step S3A or S3B, a fourth step S4 may be performed. In the fourth step S4, the write or exclusive access locks on the MD pages update by the node A 102*a* may be released. Continuing with the above example, the locks (acquired in the step S1) for the MD leaf A and the VLB page A may be released by the node A 102*a*.

Figure 7C:
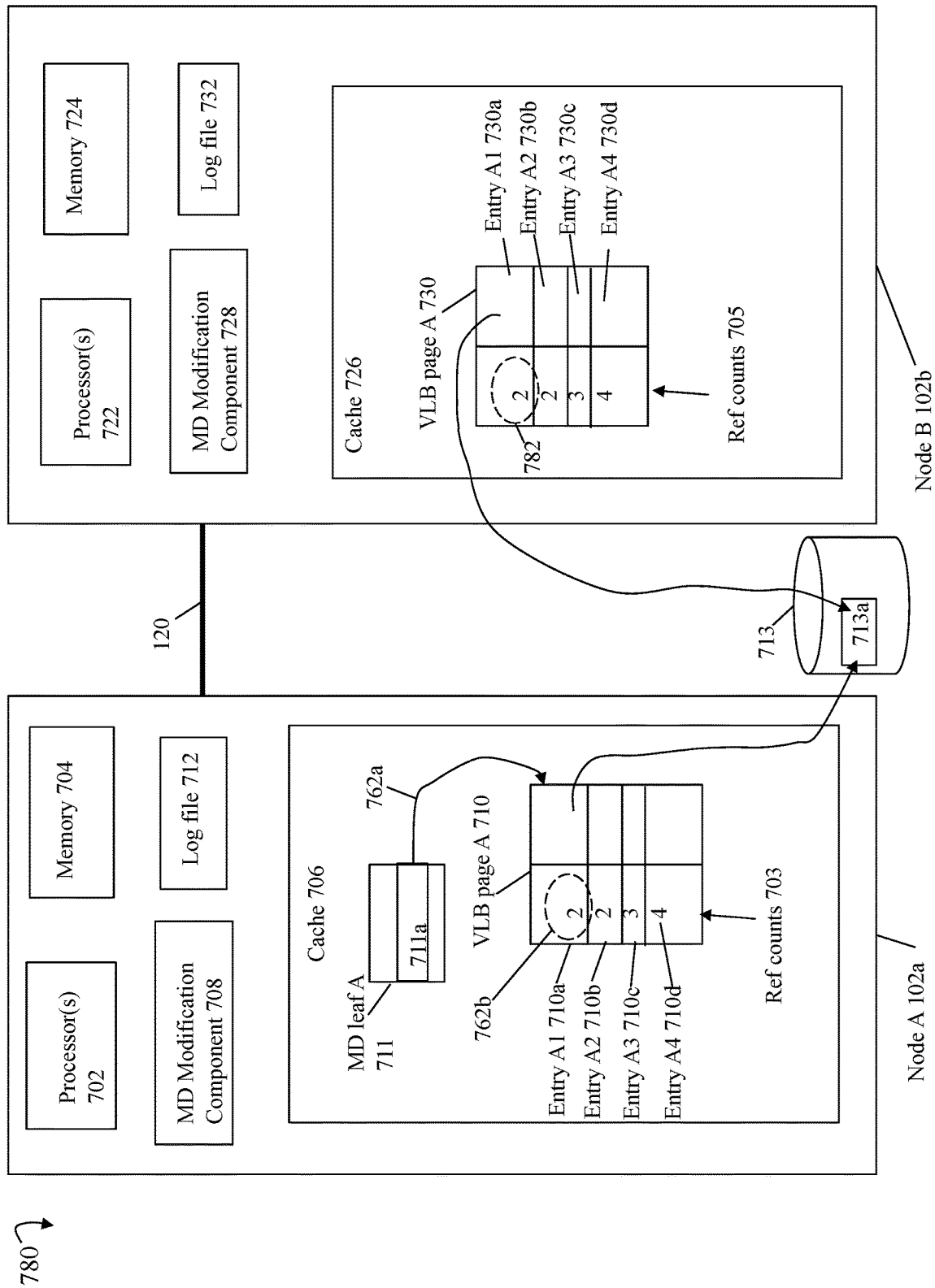

The foregoing examples described in connection with the FIGS. 7A, 7B and 7C illustrates an example where deduplication processing is performed when flushing a record of the log file 712, where the record is a log of a write I/O to a target location, and where the deduplication processing determines that the content stored at the target location is a duplicate of existing content stored at another logical address. However, consider an alternative where the record of the log file 712 is flushed and deduplication determines that the content stored at the target location is not a duplicate of existing content. In this case, a first step S11 may be performed which is similar to that as described above where write or exclusive locks are obtained on the MD leaf A 711 and the VLB page A 710. Additionally, in the step S11, physical storage is provisioned for a new data block from the BE PD 713.

Following the step S11, a step S12 may be performed to apply updates to the MD leaf A 711 and the VLB page A 710 stored in the cache 706 of the node A 102*a*. In this case, a first update is applied to the VLB page A 710 stored in the cache 706, where a new VLB entry of the VLB page A is allocated to point to the new data block and the ref count of the new VLB entry is initialized to 1. In this example, the new VLB entry is allocated from the VLB page A. More generally, the new VLB entry may be allocated from any suitable VLB page. A second update is applied in the step S12 to the MD leaf A 711 stored in the cache 706 of the node A 102*a*, where the MD leaf entry 711*a* for the target location is updated to reference the new VLB entry.

From the step S12, processing proceeds to the step S13 which is similar to the step S3 described above. The step S13 may include determining the page update (e.g., delta) to be sent. The step S13 processing may include determining, in accordance with the one or more criteria, whether to perform the step S13A and send information describing the updates 740*a*, 740*b* from the node 102*a* to the node 102*b*, or whether to perform the step S13B send a request from the node 102*a* to the node 102*b* requesting that the node 102*b* invalidate any cached copies of the MD leaf A and the VLB page A. The steps S13A and S13B are respectively similar to the steps S3A and S3B described above. After performing the step S13 and either S13A or S13B, the step S14 may be performed which is similar to the step S4 described above. In the step S14, the locks acquired for the MD leaf A and the VLB page A in the step S11 are released.

Generally, the foregoing describes examples using the techniques herein with 2 nodes. More generally, the techniques herein may be used in connection with N node, where N is an integer that is greater than or equal to 2.

Figure 8:
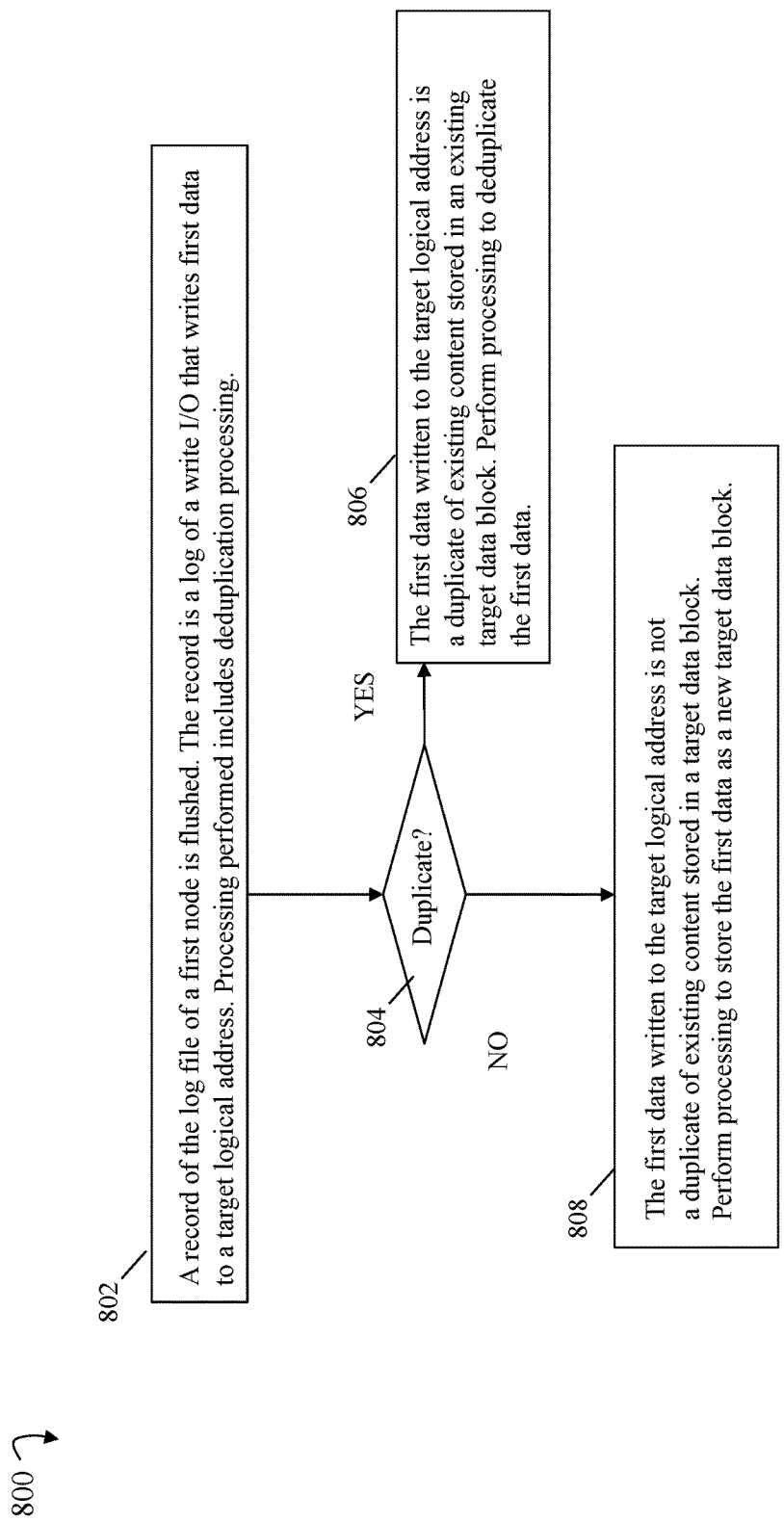
FIGS. 8, 9 and 10 are flowcharts of processing steps that may be performed in an embodiment in accordance with the techniques herein.
Figure 9:
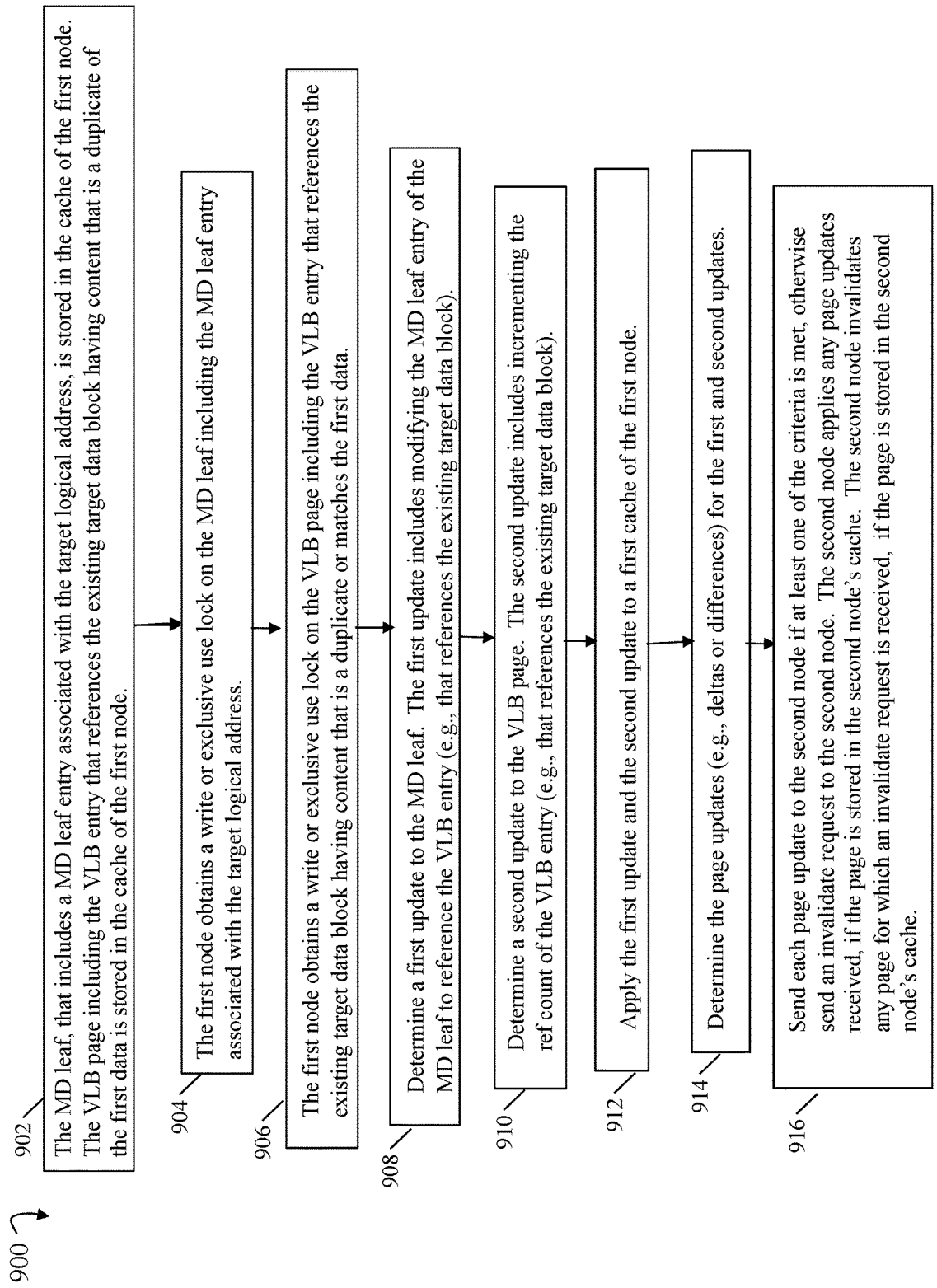
Figure 10:
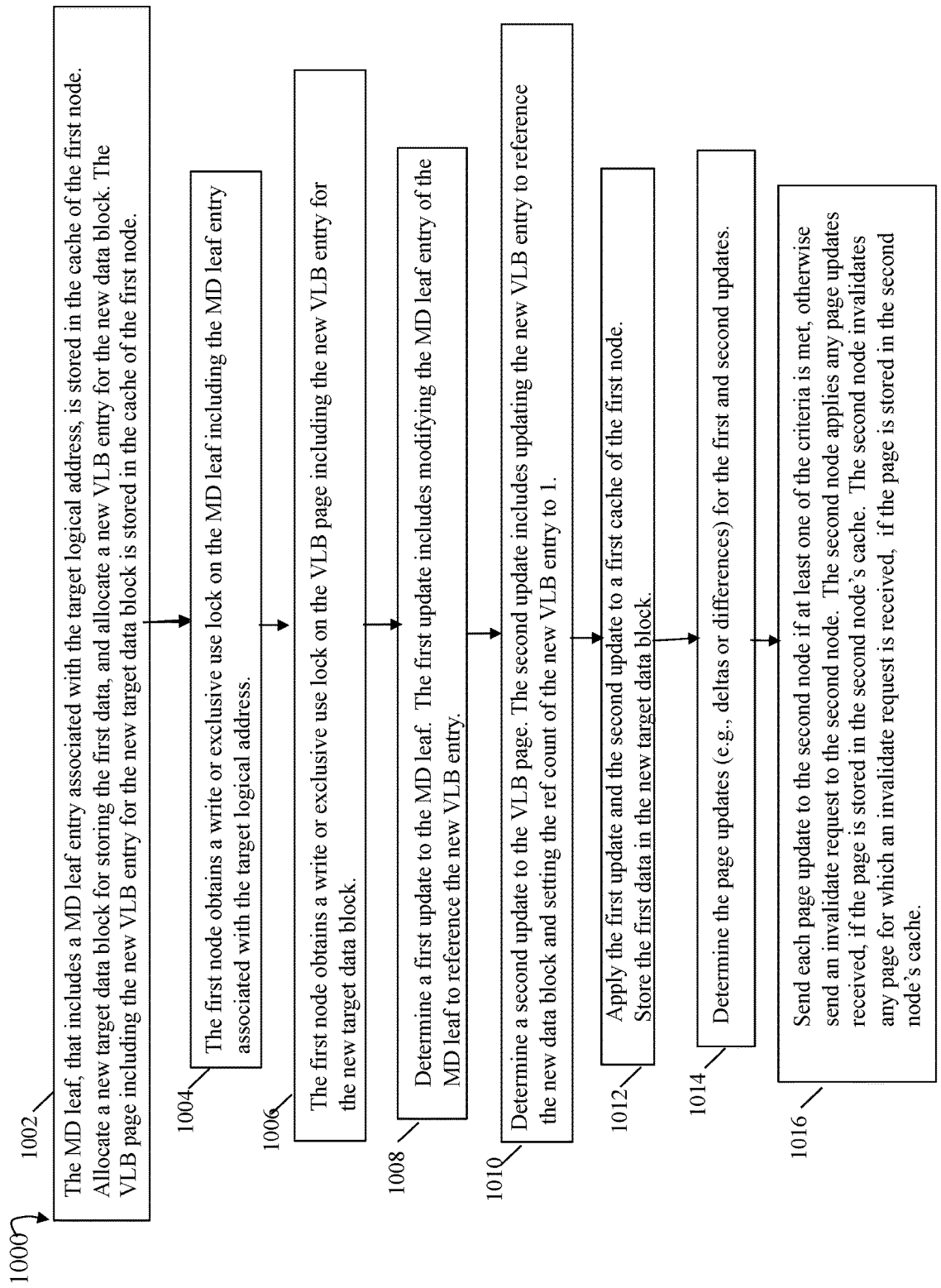

Referring to the FIGS. 8, 9 and 10, shown are flowcharts summarizing processing described above that may be performed in an embodiment in accordance with the techniques herein Referring to FIG. 8, shown is a first flowchart 800 of processing steps that may be performed in an embodiment in accordance with the techniques herein. At the step 802, a record of the log file of a first node is flushed. The record is a log of a write I/O that writes first data to a target logical address. Processing performed in the step 802 includes deduplication processing. From the step 802, control proceeds to the step 804.

At the step 804, a determination is made as to whether the first data is a duplicate of existing content stored in an existing target data block. If the step 804 evaluates to yes, control proceeds to the step 806. At the step 806, processing is performed to deduplicate the first data. The first data written to the target logical address is determined to be a duplicate of existing content stored in an existing target data block.

If the step 804 evaluates to no, control proceeds to the step 808. At the step 808, processing is performed to store the first data as a new target data block. The first data written to the target logical address is determined not to be a duplicate of existing content stored in an existing target data block.

Referring to FIG. 9, shown is a second flowchart 900 of processing steps that may be performed in an embodiment in accordance with the techniques herein. The flowchart 900 provides further detail of processing that may be performed in the step 806 of FIG. 8.

At the step 902, the MD leaf, that includes a MD leaf entry associated with the target logical address, is stored in the cache of the first node. The VLB page including the VLB entry, that references the existing target data block having content that is a duplicate of the first data, is stored in the cache of the first node. In connection with the step 902, if the foregoing MD leaf and VLB page are not already stored in the first node's cache, they are read from non-volatile storage into the first node's cache. From the step 902, control proceeds to the step 904.

At the step 904, the first node obtains a write or exclusive use lock on the MD leaf including the MD leaf entry associated with the target logical address. From the step 904, control proceeds to the step 906. At the step 906, The first node obtains a write or exclusive use lock on the VLB page including the VLB entry that references the existing target data block having content that is a duplicate or matches the first data. From the step 906, control proceeds to the step 908.

At the step 908, processing is performed to determine a first update to the MD leaf. The first update includes modifying the MD leaf entry of the MD leaf to reference the VLB entry (e.g., that references the existing target data block). From the step 908, control proceeds to the step 910.

At the step 910, processing is performed to determine a second update to the VLB page. The second update includes incrementing the ref count of the VLB entry (e.g., that references the existing target data block). From the step 910, control proceeds to the step 912. At the step 912, the first and second updates are applied to the first node's cached copies of the MD leaf and the VLB page. From the step 912, control proceeds to the step 914. At the step 914, processing is performed to determine the page updates (e.g., deltas or differences) for the first and the second updates. From the step 914, control proceeds to the step 916.

At the step 916, processing is performed to send each page update to the second node if at least one of the criteria is met; otherwise send an invalidate page request to the second node. The second node applies any page updates received, if the page is stored in the second node's cache. The second node invalidates any page for which an invalidate request is received, if the page is stored in the second node's cache.

Referring to FIG. 10, shown is a third flowchart 1000 of processing steps that may be performed in an embodiment in accordance with the techniques herein. The flowchart 1000 provides further detail of processing that may be performed in the step 808 of FIG. 8.

At the step 1002, the MD leaf, that includes a MD leaf entry associated with the target logical address, is stored in the cache of the first node. The step 1002 may include allocating a new target data block for storing the first data, and allocating a new VLB entry for the new data block. The VLB page, that includes the new VLB entry for the new target data block, is stored in the cache of the first node. In connection with the step 1002, if the foregoing MD leaf and VLB page are not already stored in the first node's cache, they are read from non-volatile storage into the first node's cache. From the step 1002, control proceeds to the step 1004.

At the step 1004, the first node obtains a write or exclusive use lock on the MD leaf including the MD leaf entry associated with the target logical address. From the step 1004, control proceeds to the step 1006. At the step 1006, the first node obtains a write or exclusive use lock on the VLB page including the new VLB entry for the new data block. From the step 1006, control proceeds to the step 1008.

At the step 1008, processing is performed to determine a first update to the MD leaf. The first update includes modifying the MD leaf entry of the MD leaf to reference the new VLB entry. From the step 1008, control proceeds to the step 1010.

At the step 1010, processing is performed to determine a second update to the VLB page. The second update includes updating the new VLB entry of the VLB page to reference the new data block, and setting the ref count of the new VLB entry to 1. From the step 1010, control proceeds to the step 1012. At the step 1012, the first and second updates are applied to the first cache of the first node. The step 1012 may also include storing the first data in the new target data block From the step 1012, control proceeds to the step 1014. At the step 1014, processing is performed to determine the page updates (e.g., deltas or differences) for the first and second updates. From the step 1014, control proceeds to the step 1016.

At the step 1016, processing is performed to send each page update to the second node if at least one of the criteria is met; otherwise an invalidate request is sent to the second node. The second node applies any page updates received, if the page is stored in the second node's cache. The second node invalidates any page for which an invalidate request is received, if the page is stored in the second node's cache.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of caching comprising:
    determining an update to a first data page of a first cache on a first node, wherein a second node includes a second cache and wherein the second cache includes a copy of the first data page;
    determining, in accordance with one or more criteria, whether to send the update from the first node to the second node;
    responsive to determining, in accordance with the one or more criteria, to send the update, sending the update from the first node to the second node; and
    responsive to determining not to send the update, sending an invalidate request from the first node to the second node, wherein the invalidate request instructs the second node to invalidate the copy of the first data page stored in the second cache of the second node.

2. The method of claim 1, wherein the update includes one or more modifications to the first data page.

3. The method of claim 1, further comprising:
    applying the update to the first data page of the first cache on the first node, wherein the first data page of the first cache of the first node includes a current content prior to applying the update and wherein the first data page of the first cache of the first node includes an updated content after applying said update to the current content.

4. The method of claim 3, wherein said determining the update further comprises:
    determining a result of performing a bit wise logical exclusive XOR operation of the current content and the updated content.

5. The method of claim 4, wherein said sending the update includes sending the result as the update from the first node to the second node.

6. The method of claim 5, wherein the copy of the first page is stored in a first cache location of the second cache of the second node, and wherein the method includes the second node performing first processing comprising:
    receiving the result from the first node;
    determining, in accordance with the result, the updated content of the first page; and
    updating the first cache location of the second cache of the second node by storing the updated content of the first page at the first cache location of the second cache of the second node.

7. The method of claim 4, wherein said determining the update further comprises:
determining a compressed result by compressing the result of the bit wise logical exclusive XOR operation of the current content and the updated content.

8. The method of claim 7, wherein said sending the update includes sending the compressed result as the update from the first node to the second node.

9. The method of claim 8, wherein the copy of the first page is stored in a first cache location of the second cache of the second node, and wherein the method includes the second node performing first processing comprising:
receiving the compressed result from the first node;
determining, in accordance with the compressed result, the updated content of the first page; and
updating the first cache location of the second cache of the second node by storing the updated content of the first page at the first cache location of the second cache of the second node.

10. The method of claim 1, wherein the one or more criteria indicates to send the update from the first node to the second node if the update has a size that is less than a specified threshold.

11. The method of claim 1, wherein the one or more criteria indicates to send the update from the first node to the second node if the update is associated with a logical address of a logical device and the logical device is designated as performance critical.

12. The method of claim 1, wherein the one or more criteria indicates to send the update from the first node to the second node if the update is associated with a logical address included in a logical address subrange of a logical device and the logical address subrange of the logical device is designated as performance critical.

13. The method of claim 1, wherein the method is performed in connection with data deduplication of a candidate data block that is a duplicate of an existing target data block, wherein the target data block is stored at a first logical address of a first logical device, and wherein the candidate data block is stored at a second logical address of a second logical device.

14. The method of claim 13, wherein the first data page is a first metadata page including metadata associated with a second logical address of the second logical device;
wherein prior to the data deduplication of the candidate block, the first logical address of the first logical device is mapped to the existing target data block and the second logical address of the second logical device is not mapped to the existing target data block;
wherein after the data deduplication of the candidate block, the second logical address of the second logical device is mapped to the existing target data block and the first logical address of the first logical device is mapped to the existing target data block; and
wherein the update includes a first data modification to the first metadata page and wherein the first data modification includes an incremented value of a reference count denoting a number of times the existing target data block is mapped to a logical address.

15. The method of claim 14, wherein a metadata structure includes the first metadata page, a second metadata page, and a third metadata page, wherein the first metadata page includes a first entry that references the existing target data block and wherein the first entry includes the reference counter denoting the number of times the existing target data block is mapped to a logical address, wherein the second metadata page includes a second entry associated with the first logical address of the first logical device and the second entry references the first entry, and wherein the third metadata page includes a third entry associated with the second logical address of the second logical device and the third entry references the first entry.

16. The method of claim 15, wherein the method includes:
determining a second update to the third metadata page and wherein the second update includes a pointer from the third entry of the third metadata page to the first entry of the first metadata page;
determining, in accordance with the one or more criteria, whether to send the second update from the first node to the second node;
responsive to determining, in accordance with the one or more criteria, to send the second update, sending the second update from the first node to the second node; and
responsive to determining not to send the second update, sending a second invalidate request from the first node to the second node, wherein the second invalidate request instructs the second node to invalidate the copy of the third metadata page stored in the second cache of the second node.

17. The method of claim 16, wherein the metadata structure is used to access data stored at logical addresses of one or more logical devices.

18. A system comprising:
one or more processors; and
a memory comprising code stored thereon that, when executed, performs a method of caching comprising:
determining an update to a first data page of a first cache on a first node, wherein a second node includes a second cache and wherein the second cache includes a copy of the first data page;
determining, in accordance with one or more criteria, whether to send the update from the first node to the second node;
responsive to determining, in accordance with the one or more criteria, to send the update, sending the update from the first node to the second node; and
responsive to determining not to send the update, sending an invalidate request from the first node to the second node, wherein the invalidate request instructs the second node to invalidate the copy of the first data page stored in the second cache of the second node.

19. A non-transitory computer readable memory comprising code stored thereon that, when executed, performs a method of caching comprising:
determining an update to a first data page of a first cache on a first node, wherein a second node includes a second cache and wherein the second cache includes a copy of the first data page;
determining, in accordance with one or more criteria, whether to send the update from the first node to the second node;
responsive to determining, in accordance with the one or more criteria, to send the update, sending the update from the first node to the second node; and
responsive to determining not to send the update, sending an invalidate request from the first node to the second node, wherein the invalidate request instructs the second node to invalidate the copy of the first data page stored in the second cache of the second node.

* * * * *